(12) United States Patent
Tolman et al.

(10) Patent No.: US 9,519,679 B2
(45) Date of Patent: Dec. 13, 2016

(54) TECHNIQUES FOR QUERY HOMOGENIZATION IN CACHE OPERATIONS

(71) Applicant: SAS Institute Inc., Cary, NC (US)

(72) Inventors: Kenneth Tolman, Durham, NC (US); Kimberly Buckler Botha, Durham, NC (US); Paul Anthony Smiley, Raleigh, NC (US); David R. Henderson, Cary, NC (US); Andrew Anderson, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/859,420

(22) Filed: Sep. 21, 2015

(65) Prior Publication Data

US 2016/0210326 A1    Jul. 21, 2016

Related U.S. Application Data

(60) Provisional application No. 62/104,996, filed on Jan. 19, 2015.

(51) Int. Cl.
*G06F 17/30* (2006.01)
*G06F 7/00* (2006.01)

(52) U.S. Cl.
CPC ... *G06F 17/30392* (2013.01); *G06F 17/30457* (2013.01)

(58) Field of Classification Search
CPC .............. G06F 12/0292; G06F 12/0638; G06F 2209/463; G06F 17/271; G06F 17/273; G06F 17/277; G06F 17/2785

USPC .......... 707/600–831, 899, 999.001–999.206
See application file for complete search history.

(56) References Cited

U.S. PATENT DOCUMENTS

| | | | |
|---|---|---|---|
| 6,088,714 A | 7/2000 | Wadleigh | |
| 6,466,931 B1* | 10/2002 | Attaluri | G06F 17/30433 |
| 6,539,382 B1* | 3/2003 | Byrne | G06F 12/0862 |
| | | | 707/694 |
| 7,464,386 B2* | 12/2008 | Millington | G06F 17/30867 |
| | | | 707/E17.005 |
| 7,773,749 B1 | 8/2010 | Durst et al. | |
| 7,864,187 B2 | 1/2011 | Fossum et al. | |

(Continued)

FOREIGN PATENT DOCUMENTS

CN    101964749    2/2011

*Primary Examiner* — Angelica Ruiz

(57) ABSTRACT

An apparatus includes a renaming component to homogenized query instructions for retrieving data items from a data set organized using index labels by identifying a declaration instruction associating an object thereof with an index label, replacing the name provided to the object the with an archetypal name based on the index label, and generating change data associating the name with the archetypal name; a hashing component to take an instruction hash of the homogenized instructions; a cache control routine to find a matching instruction hash corresponding to results of earlier database queries in a results cache; and a reversal routine to, in response finding a matching instruction hash, retrieve a cached result from the results cache associated with the matching instruction hash, and replace a name of a different object therein based on the change data and the query instructions to generate a new result of the new database query.

30 Claims, 15 Drawing Sheets

(56) References Cited

U.S. PATENT DOCUMENTS

| | | |
|---|---|---|
| 7,877,734 B2 | 1/2011 | Branda et al. |
| 7,925,857 B2 | 4/2011 | Averill et al. |
| 8,010,466 B2 | 8/2011 | Patinkin |
| 8,028,128 B2 | 9/2011 | Averill et al. |
| 8,055,813 B2 | 11/2011 | Kirscht et al. |
| 8,171,567 B1 | 5/2012 | Fraser et al. |
| 8,201,153 B2 | 6/2012 | Backhouse et al. |
| 8,205,138 B2 | 6/2012 | Blackmon et al. |
| 8,281,282 B2 | 10/2012 | Smith |
| 8,423,978 B2 | 4/2013 | Backhouse et al. |
| 8,516,448 B2 | 8/2013 | Morgia et al. |
| 8,856,022 B1 | 10/2014 | Bialostocki et al. |
| 2002/0091574 A1 | 7/2002 | Lefebvre et al. |
| 2004/0215588 A1 | 10/2004 | Cornelius |
| 2005/0055279 A1 | 3/2005 | Baur et al. |
| 2005/0285859 A1 | 12/2005 | Fossum et al. |
| 2007/0033290 A1 | 2/2007 | Valen et al. |
| 2008/0036777 A1 | 2/2008 | Fossum et al. |
| 2011/0029508 A1* | 2/2011 | Al-Omari ......... G06F 17/30433 707/718 |
| 2013/0166630 A1 | 6/2013 | Hu |
| 2014/0024318 A1 | 1/2014 | Sevindik et al. |
| 2015/0106663 A1 | 4/2015 | Richter |

* cited by examiner

TECHNIQUES FOR QUERY HOMOGENIZATION IN CACHE OPERATIONS

CROSS-REFERENCE TO RELATED APPLICATIONS

This application claims the benefit of priority under 35 U.S.C. §119(e) to U.S. Provisional Application Ser. No. 62/104,996 entitled "QUERY HOMOGENIZATION FOR IMPROVED CACHE HIT RATES AND RESULT HOMOGENIZATION FOR IMPROVED BENCH COMPARISON," filed Jan. 19, 2015, the entirety of which is incorporated herein by reference.

BACKGROUND

Database queries to effect a search of a data set may contain a large quantity of operands and operators that may each be expressed in a wide variety of ways.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

An apparatus comprising a processor component, a network interface, a renaming component, a hashing component, a cache control routine and a reversal component. The network interface is coupled to the processor component to receive query instructions executable to retrieve and process data items from a data set for a new database query, wherein the data items are organized within the data set according to an index comprising index labels. The renaming component is for execution by the processor component to generate homogenized instructions from the query instructions by identifying a declaration instruction within the query instructions that declares an object, names the object and associates the object with an index label of the data set; replacing the name provided to the object in the declaration instruction with an archetypal name based on the index label; and generating change data that associates the name provided to the object in the declaration instruction with the archetypal name. The hashing component is for execution by the processor component to take an instruction hash of the homogenized instructions. The cache control routine is for execution by the processor component to compare the instruction hash to a plurality of instruction hashes of a results cache, wherein each instruction hash of the plurality of instruction hashes corresponds to a cached result of an earlier database query. The reversal routine is for execution by the processor component to, in response to a determination that the instruction hash of the homogenized instructions matches an instruction hash of the plurality of instruction hashes, retrieve a cached result from an entry of the results cache associated with the matching instruction hash of the plurality of instruction hashes, and replace a name of an object within the retrieved cached result based on the change data and the query instructions to generate a new result of the new database query.

The apparatus may further include a reordering component for execution by the processor component to reorder a plurality of declaration instructions within the query instructions into an archetypal object order to generate the homogenized instructions, wherein the plurality of declaration instructions comprises the declaration instruction; and an execution routine for execution by the processor component to execute the query instructions to generate the new results in response to a determination that the instruction hash of the homogenized instructions does not match any instruction hash of the plurality of instruction hashes, wherein the cache control routine may generate a new entry in the results cache that is indexed with the instruction hash of the homogenized instructions added to the plurality of instruction hashes and store the new results within the new entry.

The renaming component may generate an initial archetypal name from text characters of the index label; determine whether the initial archetypal name is already in use to replace a name provided to another object by another declaration instruction; and in response to a determination that the initial archetypal name is not already in use, employ the initial archetypal name as the archetypal name to replace the name provided to the object by the declaration instruction. Also, in response to a determination that the initial archetypal name is already in use, the renaming component may augment the initial archetypal name with a numerical value; determine whether the augmented initial archetypal name is already in use; increment the numerical value in response to a determination that the augmented initial archetypal name is already in use and employ the augmented initial archetypal name as the archetypal name to replace the name provided to the object by the declaration instruction.

The renaming component may determine whether the index label comprises a quantity of text characters that exceeds a predetermined length; and in response to a determination that the quantity of text characters does not exceed the predetermined length, generate the archetypal name based on the text characters of the index label. Also, in response to a determination that the quantity of text characters does exceed the predetermined length, the renaming component may perform operations including derive a label hash value from the index label and generate the archetypal name based on the label hash value.

The apparatus may further include a removal component for execution by the processor component to determine whether execution of a formatting instruction within the query instructions affects a numerical value in the new results, and remove the formatting instruction from the query instructions to generate the homogenized instructions in response to a determination that the formatting instruction does not affect the numerical value, and a reforming component for execution by the processor component to replace the formatting instruction with an archetypal formatting instruction to generate the homogenized instructions in response to a determination that the formatting instruction does affect the numerical value.

The apparatus may include a reforming component for execution by the processor component to replace a mathematical operator within the query instructions with an archetypal mathematical operator, and a reordering component for execution by the processor component to commutatively reorder a plurality of archetypal mathematical operators and a plurality of operands associated with the plurality of archetypal mathematical operators within the query instructions into an archetypal operation order to generate the homogenized instructions, wherein the plurality of archetypal mathematical operators comprises the archetypal mathematical operator.

The apparatus may include a reforming component for execution by the processor component to replace a Boolean operator within the query instructions with an archetypal Boolean operator, and a reduction component for execution by the processor component to reduce a plurality of archetypal Boolean operators and a plurality of operands associated with the plurality of archetypal Boolean operators within the query instructions to a smaller plurality of archetypal Boolean operators and a smaller plurality of operands based on rules of Boolean algebra to generate the homogenized instructions, wherein the plurality of archetypal Boolean operators comprises the archetypal Boolean operator.

The apparatus may include a reduction component for execution by the processor component to determine whether the query instructions define a plurality of detail filters to be employed prior to execution of instructions within the query instructions that perform aggregation; in response to a determination that the query instructions define a plurality of detail filters, replace instructions within the query instructions that define the plurality of detail filters with a first "AND" operator that defines the plurality of detail filters to generate the homogenized instructions; determine whether the query instructions define a plurality of post-aggregation filters to be employed following the execution of the instructions that perform the aggregation; and in response to a determination that the query instructions define a plurality of post-aggregation filters, replace instructions within the query instructions that define the plurality of post-aggregation filters with a second "AND" operator that defines the plurality of post-aggregation filters to generate the homogenized instructions.

The apparatus may include a security component for execution by the processor component to receive permissions data that indicates a degree of access to the data set that a person originating the new database query is granted, encode an indication of that degree of access into at least one byte, and augment the homogenized instructions with the at least one byte prior to the taking of the instruction hash.

The apparatus may include a security component to receive an indication of a degree of access to the data set that a person originating the new database query is granted, encode an indication of that degree of access into at least one byte, and augment the homogenized instructions with the at least one byte prior to the taking of the instruction hash.

A computer-program product tangibly embodied in a non-transitory machine-readable storage medium, the computer-program product including instructions operable to cause a processor component to perform operations including receive query instructions executable to retrieve and process data items from a data set for a new database query, wherein the data items are organized within the data set according to an index comprising index labels; perform operations to generate homogenized instructions from the query instructions, including identify a declaration instruction within the query instructions that declares an object, names the object and associates the object with an index label of the data set, replace the name provided to the object in the declaration instruction with an archetypal name based on the index label and generate change data that associates the name provided to the object in the declaration instruction with the archetypal name; take an instruction hash of the homogenized instructions; compare the instruction hash to a plurality of instruction hashes of a results cache, wherein each instruction hash of the plurality of instruction hashes corresponds to a cached result of an earlier database query; and in response to a determination that the instruction hash of the homogenized instructions matches an instruction hash of the plurality of instruction hashes, perform operations including retrieve a cached result from an entry of the results cache associated with the matching instruction hash of the plurality of instruction hashes and replace a name of an object within the retrieved cached result based on the change data and the query instructions to generate a new result of the new database query.

A computer-implemented method may include receiving, at a computing device, query instructions executable to retrieve and process data items from a data set for a new database query, wherein the data items are organized within the data set according to an index comprising index labels; identifying a declaration instruction within the query instructions that declares an object, names the object and associates the object with an index label of the data set; replacing the name provided to the object in the declaration instruction with an archetypal name based on the index label to generate homogenized instructions from the query instructions; generating change data that associates the name provided to the object in the declaration instruction with the archetypal name; take an instruction hash of the homogenized instructions; comparing the instruction hash to a plurality of instruction hashes of a results cache, wherein each instruction hash of the plurality of instruction hashes corresponds to a cached result of an earlier database query; and in response to a determination that the instruction hash of the homogenized instructions matches an instruction hash of the plurality of instruction hashes, retrieving a cached result from an entry of the results cache associated with the matching instruction hash, and replacing a name of an object within the retrieved cached result based on the change data and the query instructions to generate a new result of the new database query.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1A:
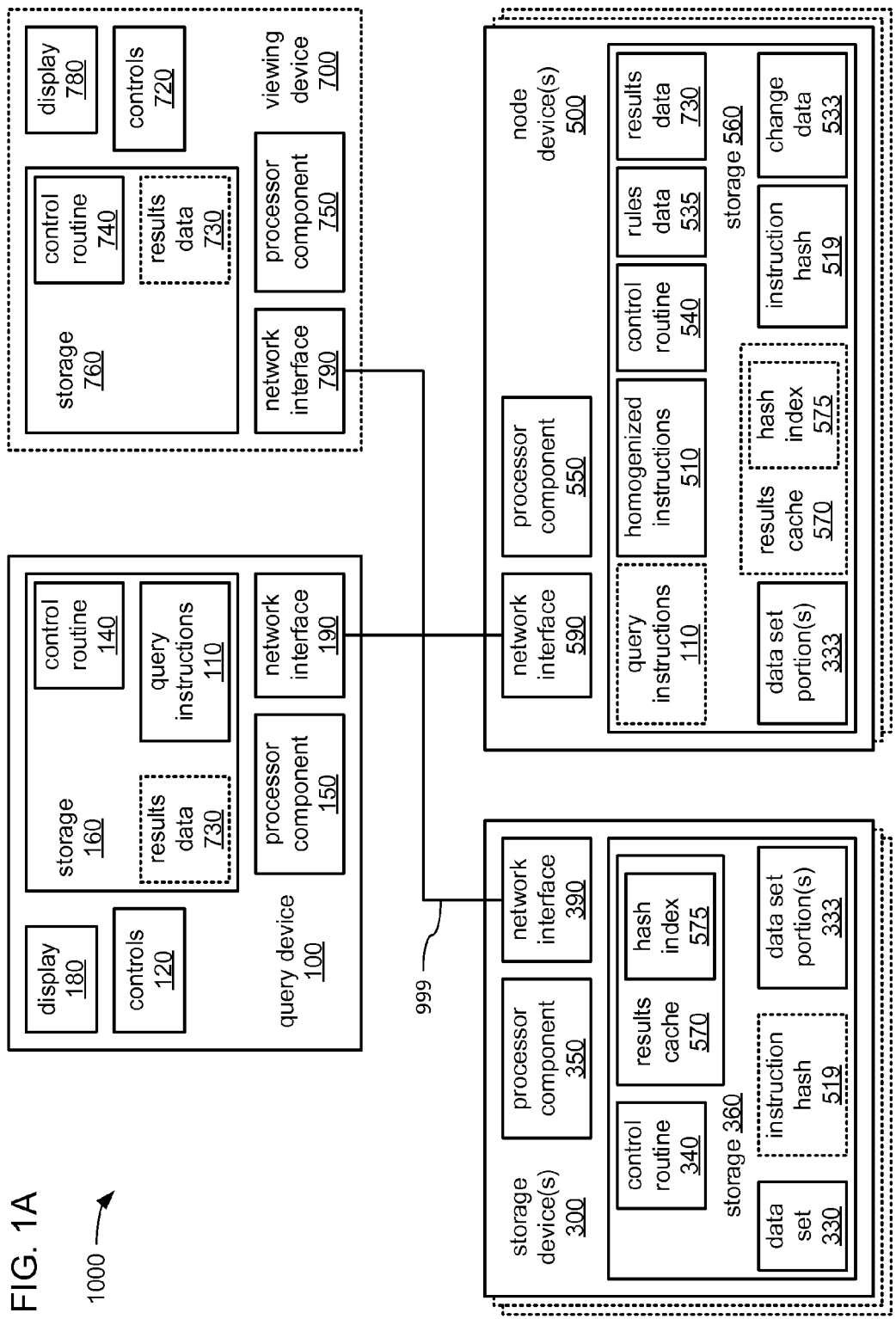
FIGS. 1A and 1B each illustrate an example embodiment of a database system.

Various embodiments described herein are generally directed to techniques for homogenizing query instructions of a new database query to enable identification of the cached earlier results of a similar earlier database query. The resulting homogenized instructions may then be used as the basis to identify a previous logically similar database query, thereby enabling the results of that earlier query to be used again as the basis of the new results for the new database query. It should be noted that a database query to retrieve data from a database may be performed as part of a larger database task, such as and not limited to, a data analysis of past events or an analysis of data recorded of past events to make a forecast of future events. In homogenizing the query instructions, objects not relevant to the new database query may be removed, and objects that are relevant to the new database query may be renamed, reformed, and/or reordered in accordance with one or more canonical rules. An instruction hash may then be taken of the homogenized form of the query instructions for comparison to one or more instruction hashes taken of homogenized forms of earlier query instructions of one or more earlier database queries to identify a match thereamong. If such a match is found, then the cached results from the performance of the matching earlier database query may be retrieved from a results cache in less time and using fewer resources than would be required to perform the new database query. A reversal of the homogenization performed on the query instructions may then be performed on the retrieved cached results to generate new results for the new database query.

The caching of the results of earlier database queries enables those earlier results to be provided more quickly in response to a new and similar database query (e.g., a fraction of a second versus half a minute). By way of example, the performance of a database query may require portions of data to be searched for and retrieved from a relatively large data set stored among multiple storage devices, and may then further require the performance of various filter and/or aggregation calculations on a large quantity of data items to generate the results of the database query. Given the considerable size of many data sets and of the portions of data to be searched for and retrieved from such data sets (e.g., data sets that may be made up of billions of data items and that may be stored across numerous storage devices), performing a database query may entail considerable use of processing, memory, and other resources of multiple devices, as well as considerable use of multiple network connections among those multiple devices. In contrast, query instructions, hashes of query instructions and the results of earlier database queries are often considerably smaller in size than a data set. Thus, query instructions, hashes thereof and results of earlier database queries may require considerably less storage space to store and/or considerably less network bandwidth to exchange between devices. Thus, homogenizing query instructions, taking a hash of the resulting homogenized version of the query instructions, and then matching that hash to the hash taken of a homogenized version of earlier query instructions to retrieve the results of performing an earlier database query from a cache may require far less in the way of processing, memory and other resources, and may require far less usage of a network.

A query device may provide a user interface by which a user of the query device may provide query instructions for performing a new database query. In some embodiments, the user interface may present on a display an assortment of requests for pieces of information from the user concerning aspects of the new database query, and may generate at least a portion of the query instructions from responses provided by the user to those requests. Alternatively or additionally, the user interface may provide ability for the user to directly provide at least a portion of the query instructions. Again, the query instructions may be part of a larger set of instructions to perform a larger database task of which the new database query is a part. Thus, the user interface may be employed by the user to provide instructions for more than the new database query. Regardless of the manner in which the query instructions may be generated and/or provided, the query instructions may be made up of expressions and/or syntax associated with one or more languages.

As part of homogenizing the query instructions, the query device or node device of a database system may interpret expressions and/or syntax of the query instructions to distinguish objects that are relevant to the new database query from other objects. Such a removal of objects may be performed as part of converting the query instructions from one language to a selected archetypal language. Objects that are not relevant to the new database query may be entirely removed from the query instructions. Such removed objects may include expressions of instructions that perform functions that are entirely unrelated to the new database query, such as instructions to visually present and/or transmit the results of the new database query. Such removed objects may also include declarations of variables, definitions of functions or procedures, data type definitions, etc. that may have been mistakenly left entirely unused. Such removed objects may further include formatting instructions to format items to be received, presented and/or transmitted that have no effect on the data content of any portions of data that may be retrieved from a data set during performance of the new database query, and therefore have no effect on the new results that may be generated from performance of the new database query.

However, some formatting instructions may have bearing on the results of the new database query, such as type definitions that define one or more numerical objects as having a particular integer or floating point format. Such formatting instructions may be reformed to specify one or more selected archetypal formats. In some embodiments, the one or more selected archetypal formats may be so selected to remove an unnecessary degree of precision.

Also, as part of homogenizing the query instructions, the query device or node device may interpret expressions and/or syntax of the query instructions to identify names given to various objects and may rename those objects in accordance with one or more canonical rules. By way of example, the query instructions may include declarations for variables and/or other objects that are associated with various specified portions of data to be retrieved from the data set, and those portions of data may include various labels as part of an indexing scheme for use in accessing data items within that data set. Such variables and/or other objects may be renamed with homogenized names based on such labels. In some embodiments, the homogenized names may include a prefix, a suffix and/or other portion made up of characters selected to be unlikely to be matched by any name given to any variable or object in the query instructions prior to homogenization.

As a further part of homogenizing the query instructions, the query device or node device may interpret expressions and/or syntax of the query instructions to identify and combine detail filters used in selecting portions of data to use in generating the new results as part of searching for those portions of data in a data set. By way of example, instructions specifying the selection of various portions of data to be retrieved from a data set based on the results of comparing numeric values may be gathered together and assembled into a single detail filter. In so doing, the various operands employed in specifying those detail filters may be reordered in accordance with one or more canonical rules. Similarly, the post-aggregation filters used in selecting results of one or more aggregation operations to be included in the new results of performing the new database query may also be identified and combined. By way of example, instructions specifying the selection of the values of one or more averaging, summation and/or other aggregation operation based on the results of comparing numeric values may be gathered together and assembled into a single post-aggregation filter. In so doing, the various operands employed in specifying those post-aggregation filters may be reordered in accordance with one or more canonical rules.

Still further, as part of homogenizing the query instructions, the query device or node device may interpret expressions and/or syntax of the query instructions to identify mathematical operators and may replace one or more of those mathematical operators with selected archetypal mathematical operator(s). Following such replacement of one or more mathematical operators, those mathematical operators and/or their associated operands may be commutatively reordered in accordance with one or more canonical rules. Such replacement and/or reordering may include simplifying the manner in which operators and associated operands within parenthesis are nested. Similarly, one or more logical operators may also be replaced with selected archetypal logical operator(s), and following such replacement, those logical operators and their associated operands may be commutatively reordered in accordance with one or more canonical rules.

Yet further, as part of homogenizing the query instructions, the query device or node device may interpret expressions and/or syntax of the new query instructions to reverse at least one pair of axes by which portions of data are to be searched for and retrieved from the data set in accordance with one or more canonical rules. By way of example, instructions to search through the data set for portions of data in a column-by-column manner along multiple rows of the data set may be reformed to search through the data set in a row-by-row manner along multiple columns of the data set.

Along with homogenizing the query instructions, the query device or node device may encode an indication of what portions of the data set the user of the query device has security permissions to access. By way of example, different security permissions may be associated with different portions of the data set such that different persons may be have security permissions to access different ones of those portions. The security permissions associated with the user of the query device may be retrieved from the data set or elsewhere, and indications of which of those portions the user has permission to access may be encoded into an archetypal data structure that may be appended to or otherwise associated with the homogenized form of the query instructions. In some embodiments, such a data structure may be a single byte, word, doubleword, quadword, etc. in which each bit stores a Boolean value indicative of whether the user has permission to access a particular portion of the data set that corresponds to that bit.

Following homogenization of the query instructions and encoding of the security permissions associated with the user of the query device into a data structure, an instruction hash may be taken of the homogenized form of the query instructions, or of a combination of the homogenized form of the query instructions and the data structure. The resulting instruction hash may then be compared to instruction hashes similarly taken of at least the homogenized versions of earlier query instructions. If a match is found, such a match indicates that the homogenized version of query instructions matches the homogenized version of one of multiple earlier query instructions of which such an instruction hash was earlier taken, and accordingly, that a cached result of performing the matching earlier query instructions are available in a cache of multiple cached results to be retrieved and used as the basis for generating the new results of the new database query set forth in the query instructions. The cached result of the matching one of the earlier query instructions may then be so retrieved and a reversal of the homogenization performed on the query instructions may be performed on the retrieved cached result to generate the new results.

With general reference to notations and nomenclature used herein, portions of the detailed description that follows may be presented in terms of program procedures executed by a processor component of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a person. However, no such capability of a person is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A illustrates a block diagram of an example embodiment of a database system 1000 incorporating a query device 100, one or more storage devices 300, one or more node devices 500, and/or a viewing device 700.

As depicted, these devices 100, 300, 500 and/or 700 may exchange communications thereamong that convey query instructions to perform database queries and/or results of the performances of database queries through a network 999. However, one or more of the devices 100, 300, 500 and/or 700 may exchange other data entirely unrelated to database queries with each other and/or with still other devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The query device 100 provides a user interface to an user thereof by which the user may provide query instructions 110 setting forth a new database query that may entail a search through a data set 330 stored by the one or more of the storage devices 300. In generating results data 730 representing new results corresponding to the new database query, the one or more storage devices 300 may search the data set 330 to retrieve portions of data, and the one or more node devices 500 may perform various aggregation operations on those portions of data to generate the results data 730. However, as will be explained in detail, where cached results from a similar earlier database query are identified from which the results data 730 may be generated, the need to expend the processing, memory and other resources to perform such a search through the data set 330 may be obviated. Again, it should be noted that a database query to retrieve data from a database may be a subtask of a larger database task, such as and not limited to, a data analysis and/or forecasting based on data concerning past events. Stated differently, a database query may simply be part of an effort to use the data of a database as an input to a larger task that may also employ other inputs not derived from a database (e.g., recently collected data not yet made part of a database and that represents a current situation). By way of example, data from a database of historical data (e.g., historical market data, data from earlier earthquakes, data gathered from earlier vehicular crash tests, etc.) may be used alongside other newer or more current data (e.g., current market activity, measurements of new earthquake tremors, engineering data concerning a proposed vehicle redesigned, etc.) to derive a prediction of what is deemed most likely to occur next (e.g., an important market shift, an expected larger earthquake tremor, a prediction about crash testing the redesigned vehicle, etc.).

Figure 1B:
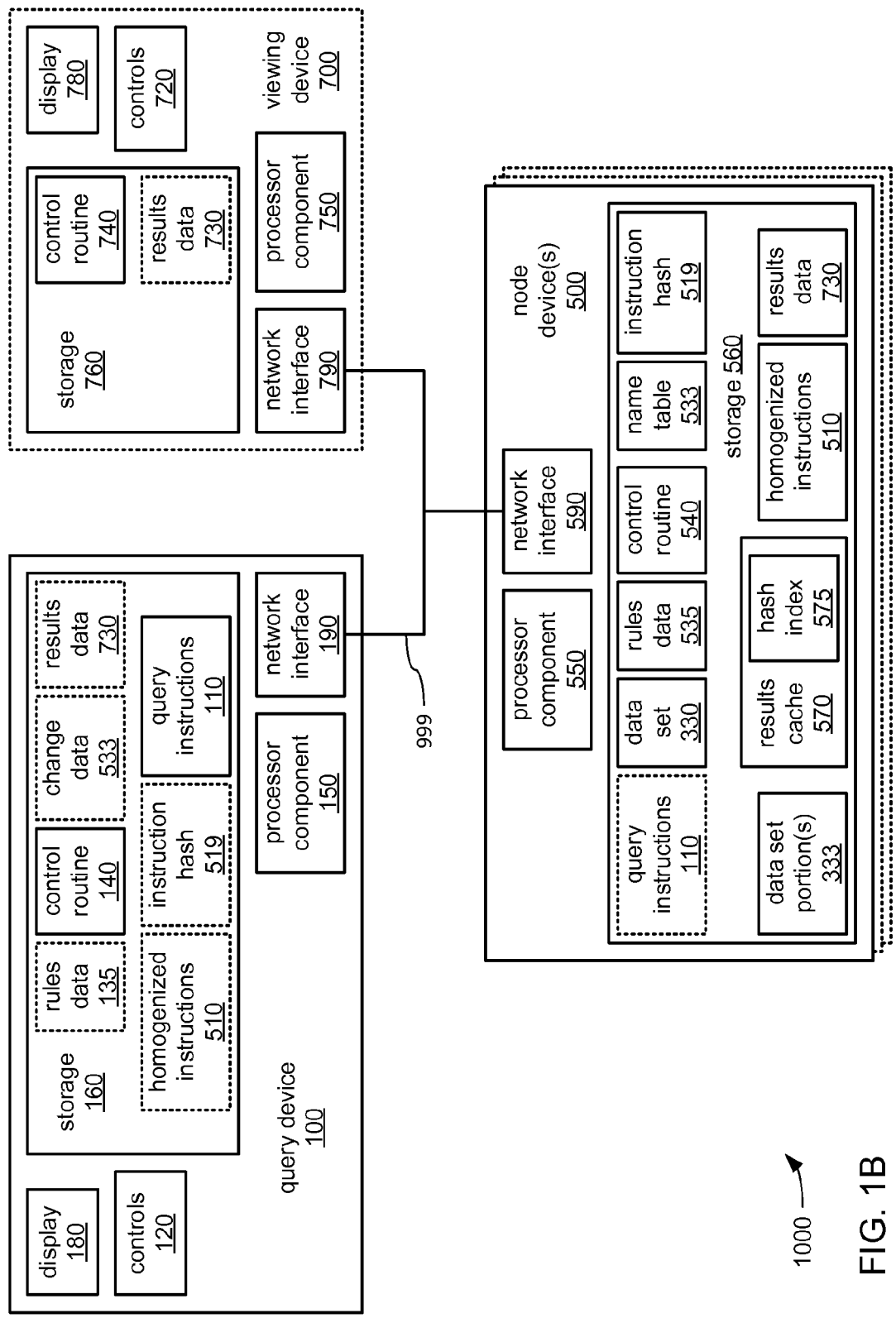

FIG. 1B illustrates a block diagram of an alternate example embodiment of the database system 1000 that is substantially similar to the example of FIG. 1A, but featuring an alternate embodiment of the one or more node devices 500 that store and perform searches on the data set 330 in lieu of the one or more storage devices 300 of FIG. 1A doing so. Thus, in FIG. 1B, such an alternate embodiment of the node devices 500 may, themselves, perform the search of the data set 330 to retrieve the one or more portions of data from which to generate the new results represented by the results data 730 in response to no cached results being identified from which the results data 730 may be generated.

Returning to FIG. 1A, in various embodiments, the query device 100 incorporates one or more of a processor component 150, a storage 160, manually-operable controls 120, a display 180 and a network interface 190 to couple the query device 100 to the network 999. The storage 160 may store one or more of a control routine 140, the query instructions 110 and the results data 730. The control routine 140 may incorporate a sequence of instructions operative on the processor component 150 to implement logic to perform various functions.

In executing the control routine 140, the processor component 150 of the query device 100 may operate the display 180 and the controls 120 thereof to provide a user interface to an user of the query device 100 to enable the user to provide at least a portion of the query instructions 110 setting forth a new database query. In some embodiments, such a user interface may include a text editor that enables the user to directly enter at least a portion of the query instructions 110. In other embodiments, such a user interface may guide the user in a step-by-step manner with various prompts through the entry of pieces of information from which the processor component 150 may generate at least a portion of the query instructions 110. Following generation of the query instructions 110, the processor component 150 may operate the network interface 190 to transmit the query instructions 110 via the network 999 to one or more of the storage devices 300 and/or one or more of the node devices 500.

In various embodiments, each of the node devices 500 incorporates one or more of a processor component 550, a storage 560 and a network interface 590 to couple the node device 500 to the network 999. The storage 560 may store one or more of the query instructions 110, one or more data set portions 333, homogenized instructions 510, an instruction hash 519, a change data 530, rules data 535, a control routine 540, results cache 570 and the results data 730. The results cache 570 may include the hash index 575. In embodiments in which the one or more node devices 500 also directly store and perform searches on the data set 330, the storage 560 of each of the one or more node devices 500 may also store at least a portion of the data set 330. The control routine 540 may incorporate a sequence of instructions operative on the processor component 550 of a single node device 500 or multiple ones of the node devices 500 to implement logic to perform various functions.

In executing the control routine 540, the processor component 550 of one or more of the node devices 500 may homogenize the expressions and/or syntax of the query instructions 110 to generate a homogenized version of the query instructions 110 stored as the homogenized instructions 510. The processor component 550 may then take a hash of the homogenized instructions 510 stored as the instruction hash 519. However, in alternate embodiments, it may be the processor component 150 of the query device 100 which, in executing the control routine 140, homogenizes the query instructions 110 to generate the homogenized instructions 510 and takes the instruction hash 519 thereof.

Regardless of which device generates the homogenized instructions 510 or takes the instruction hash 519 thereof, the processor component 550 of one or more of the node devices may be caused by executing the control routine 540 to compare the instruction hash 519 to other instruction hashes within the hash index 575. The hash index 575 may be made up of instruction hashes taken of homogenized versions of earlier query instructions. As will be explained in greater detail, a match between the instruction hash 519 and one of the instruction hashes within the hash index 575 indicates that an earlier database query using earlier query instructions that are substantively similar was earlier performed, and that there are cached results generated by the performance of that earlier database query. Stated differently, by comparing the instruction hash 519 to each instruction hash within the hash index 575, a cached result may be identified that may be used by the processor component 550 of at least one of the node devices 500 to generate the results data 730 representing the new results of the new database query represented by the query instructions 110. If such a cached result is identified, then the use of that cached result to generate the results data 730 may alleviate the need to expend resources among the devices 300 and/or 500 to actually execute the query instructions 110.

In various embodiments, each of the storage devices 300 (if present in the database system 1000) incorporates one or more of a processor component 350, a storage 360 and a network interface 390 to couple the storage device 300 to the network 999. The storage 360 may store one or more of at least a portion of the data set 330, one or more data set portions 333, a control routine 340, the instruction hash 519, and the results cache 570. The control routine 340 may incorporate a sequence of instructions operative on the processor component 350 of a single storage device 300 or multiple ones of the storage devices 300 to implement logic to perform various functions.

In executing the control routine 340, the processor component 350 of one or more of the storage devices 300 may maintain portions of the data set 330 distributed among multiple ones of the storage devices 300. As recognizable to those skilled in the art, this may be done in a manner that effects redundancy in the storage of the data set 330 and/or to improve the speed of access to the data set 330 through use of parallelism. However, in alternate embodiments that do not include the one or more storage devices 300 as depicted in FIG. 1B, it may be the one or more node devices 500 that store and maintain the data set 330, and that perform searches of the data set 330.

In further executing the control routine 340, the processor component 350 of one or more of the storage devices 300 may perform a search through the data set 330 to retrieve one or more data set portions 333 from the data set 330 from which the results data 730 may be generated where no cached result is found from which to do so. In some embodiments, one or more of the storage devices 300 may receive an indication transmitted via the network 999 from one or more of the node devices 500 as to whether or not such a cached result was identified via the aforedescribed comparison of the instruction hash 519 to the instruction hashes within the hash index 575 of the results cache 570. In other embodiments, it may be one or more of the storage devices 300 that maintains the results cache 570, and it may be the processor component 350 of one or more of the storage devices 300 that performs the comparison of the instruction hash 519 to the instruction hashes within the hash index 575. Regardless of whether one or more of the node devices 500 or one or more of the storage devices 300 performs such a comparison of instruction hashes, the processor component 350 of one or more of the storage devices 300 may perform such a search of the data set 330 based in response to no such cached result being identified. Where such a search is performed, and upon retrieving the one or more data set portions 333 from the data set 330, the processor component 350 of one or more of the storage devices 300 may operate respective ones of the network interface 390 to transmit the one or more retrieved data set portions 333 to one or more of the node devices 500.

In various embodiments, the viewing device 700 incorporates one or more of a processor component 750, a storage 760, manually-operable controls 720, a display 780 and a network interface 790 to couple the viewing device 700 to the network 999. The storage 760 may store one or more of a control routine 740 and the results data 730. The control routine 740 may incorporate a sequence of instructions operative on the processor component 750 to implement logic to perform various functions.

In executing the control routine 740, the processor component 750 of the viewing device 700 may operate the network interface 790 to await receipt of the results data 730 from one of the node devices 500. Regardless of whether the results data 730 is generated from a cached result identified in the results cache 570 or is generated by executing the query instructions 110 to perform the new database query, at least one of the node devices 500 may transmit at least a portion of the results data 730 to the query device 100 and/or the viewing device 700. Upon receipt of the results data 730, the processor component 750 may be caused by execution of the control routine 740 to generate a visual representation of the new results represented by the results data 730, and may present that visual representation on the display 780.

Correspondingly, the processor component of the query device 100 may be caused by execution of the control routine 140 to also operate the network interface 190 to await receipt of the results data 730 from one of the node devices 500. Upon receipt of the results data 730, the processor component 150 may similarly generate a visual representation of the new results represented by the results data 730, and may present that visual representation on the display 180. Alternatively or additionally, the processor component 150 may employ the results data 730 as an input to further database processing operations.

Figure 2A:
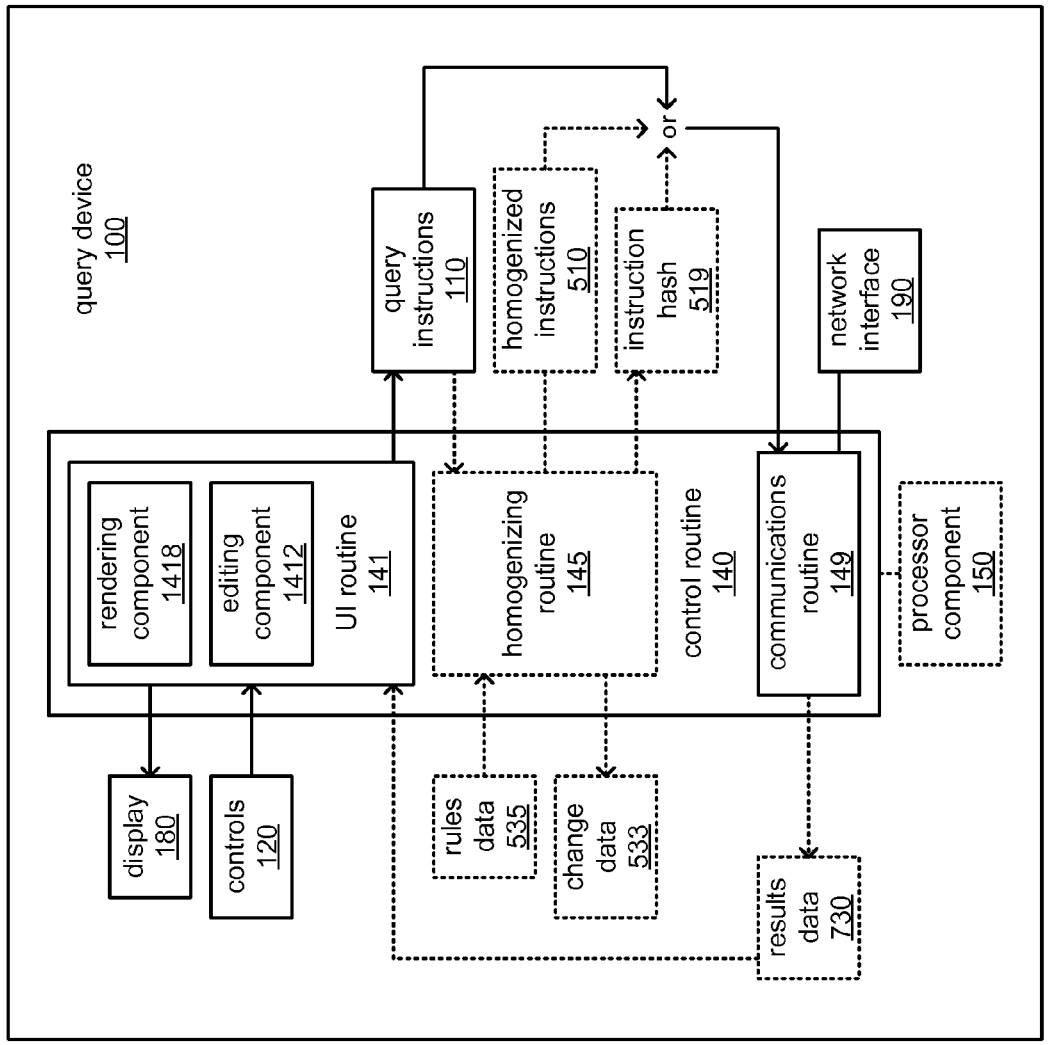
FIGS. 2A, 2B and 2C illustrate examples of operating environments for portions of a database system.
Figure 2B:
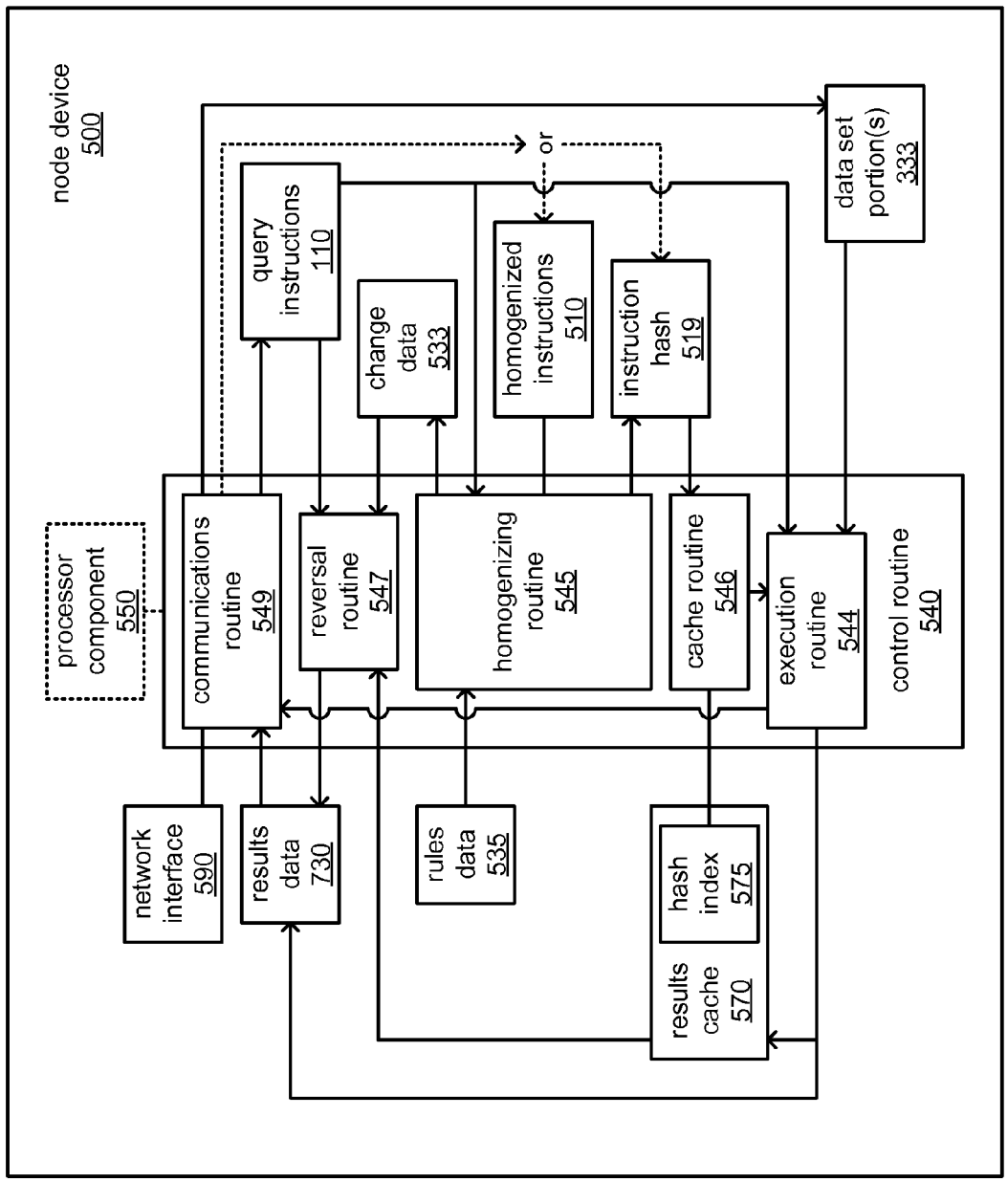
Figure 2C:
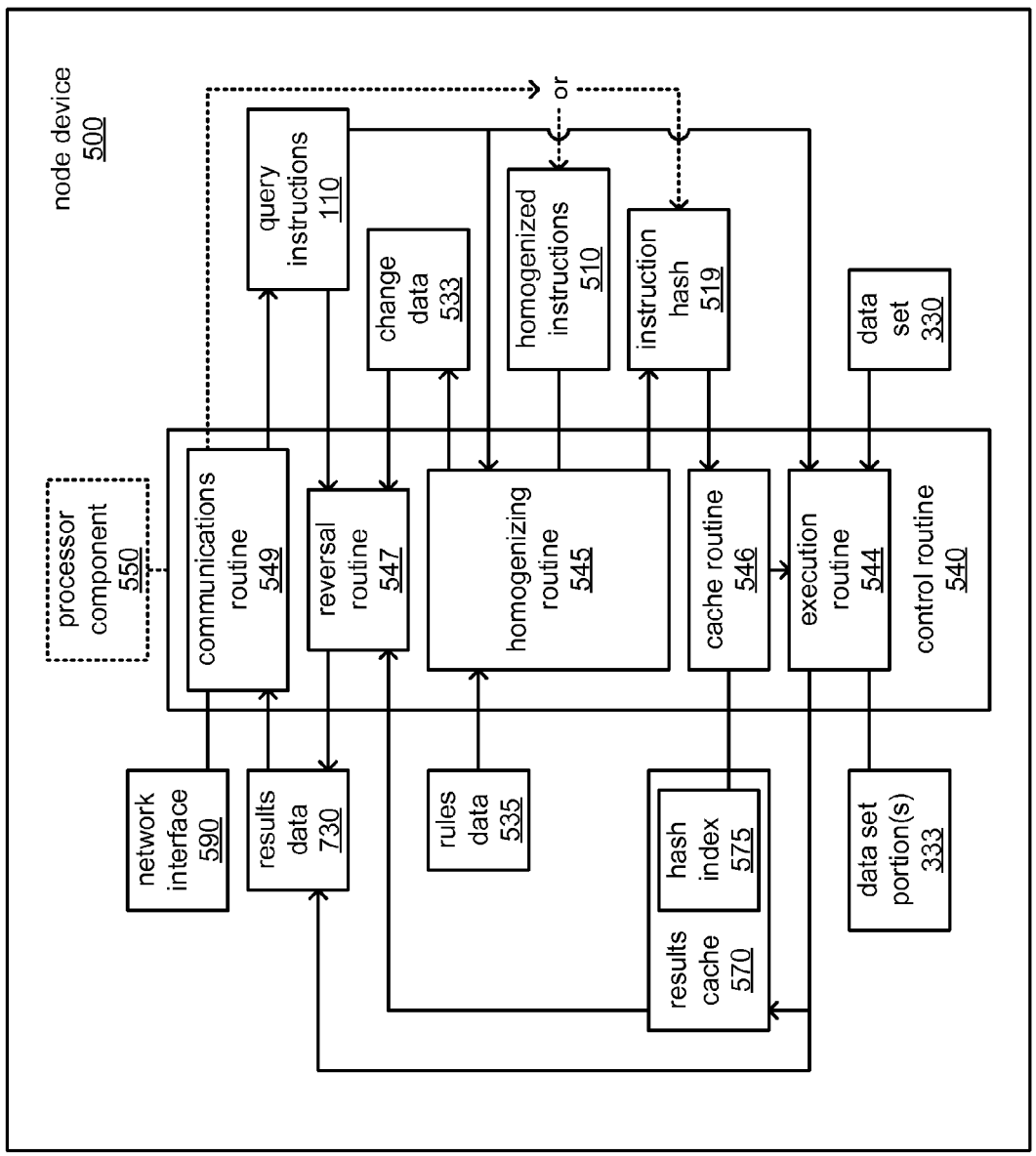

FIGS. 2A, 2B and 2C each illustrate a block diagram of a portion of an embodiment of the database system 1000. More specifically, FIG. 2A depicts aspects of the operating environment of an embodiment of the query device 100 in which the processor component 150, in executing the control routine 140, may receive the query instructions 110. Additionally, the processor component 150 may be caused to homogenize the query instructions 110 to generate the homogenized instructions 510, and may then take the instruction hash 519 of the homogenized instructions 510. FIGS. 2B and 2C depict aspects of the operating environments of two different embodiments of one of the node devices 500 in which the processor component 550, in executing the control routine 540, may homogenize the query instructions 110 to generate the homogenized instructions 510, and may then take the instruction hash 519 of the homogenized instructions 510 where the query device 100 does not. Additionally, the processor component 550 may be caused to use the instruction hash 519 to attempt to identify a cached result from which to generate the result data 730. If such a cached result is not identified, then the processor component 550 in the example embodiment of FIG. 5B may transmit an indication to the one or more storage devices 300 to search the data set 330 for the data set portions 333 from which the results data 730 may be generated, or the processor component 550 in the embodiment of FIG. 5C may directly search at least a portion of the data set 330.

The control routines 140, 340, 540 and 740, including the components of which each is composed, are selected to be operative on whatever type of processor or processors that are selected to implement applicable ones of the processor components 150, 350, 550 or 750. In various embodiments, each of the control routines 140, 340, 540 and/or 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 350, 550 or 750. Where one or more device drivers are included, those device drivers may provide support for any of a variety of other components, whether hardware or software components, of corresponding ones of the devices 100, 300, 500 or 700.

Referring to all three of FIGS. 2A-C, the control routines 140 and/or 540 may include a communications component 149 and/or 549 executable by the processor component 150 and/or 550 to operate the network interface 190 and/or 590, respectively, to exchange communications via the network 999 as has been described. Among the communications may be those conveying the query instructions 110, the homogenized instructions 510, the instruction hash 519, the one or more of the data set portions 333 and/or the results data 730 among the devices 100, 300, 500 and/or 700 via the network 999. The communications components 149 and/or 549 may be selected to be operable with whatever type of interface technology is selected to implement the network interfaces 190 and/or 590, respectively.

Turning more specifically to FIG. 2A, the control routine 140 may include a user interface routine (UI) routine 141 for execution by the processor component 150 to operate the controls 120 and/or the display 180 to provide a user interface to a user of the query device 100. As previously discussed, such provision of a user interface may enable the user to provide at least a portion of the query instructions 110. As depicted, the UI routine 141 may include an editing component 1412 to provide a text editing environment or other UI environment in which the user may operate the controls 120 to enter at least a portion of the query instructions 110 to thereby enter a new database query into the query device 100. Alternatively or additionally, and as also depicted, the UI routine 141 may include a rendering component 1418 to generate and/or operate the display 180 to visually present one or more visual prompts requesting pieces of information for a new database query, and may use the responses provided by the user (e.g., via the controls 120) to generate at least a portion of the query instructions 110. As still another alternative, an user of the query device 100 may provide the query instructions 110 to the query device 100 in any of a variety of other ways, including and not limited to, via removable media (e.g., a removable solid state storage device, not shown), or via a wired or wireless link between the query device 100 and another device (not shown). Regardless of the manner in which the query instructions 110 are received by and/or are generated within the query device 100, the communications component 149 may operate the network interface 190 to transmit the query instructions 110 to one or more of the node devices 500 and/or the storage devices 300.

Figure 3A:
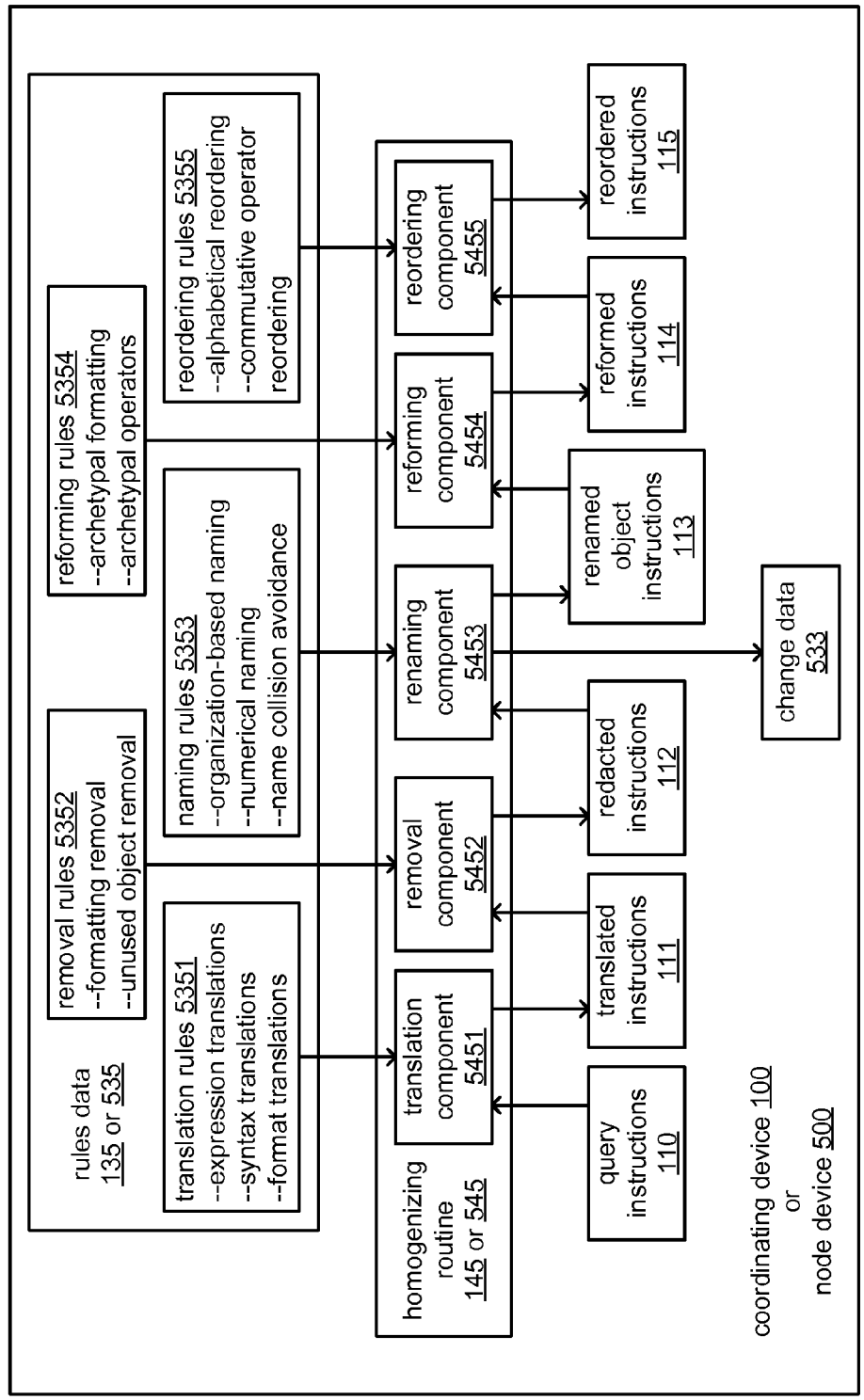
FIGS. 3A and 3B, together, illustrate an example of homogenizing and taking an instruction hash of query instructions.
Figure 3B:
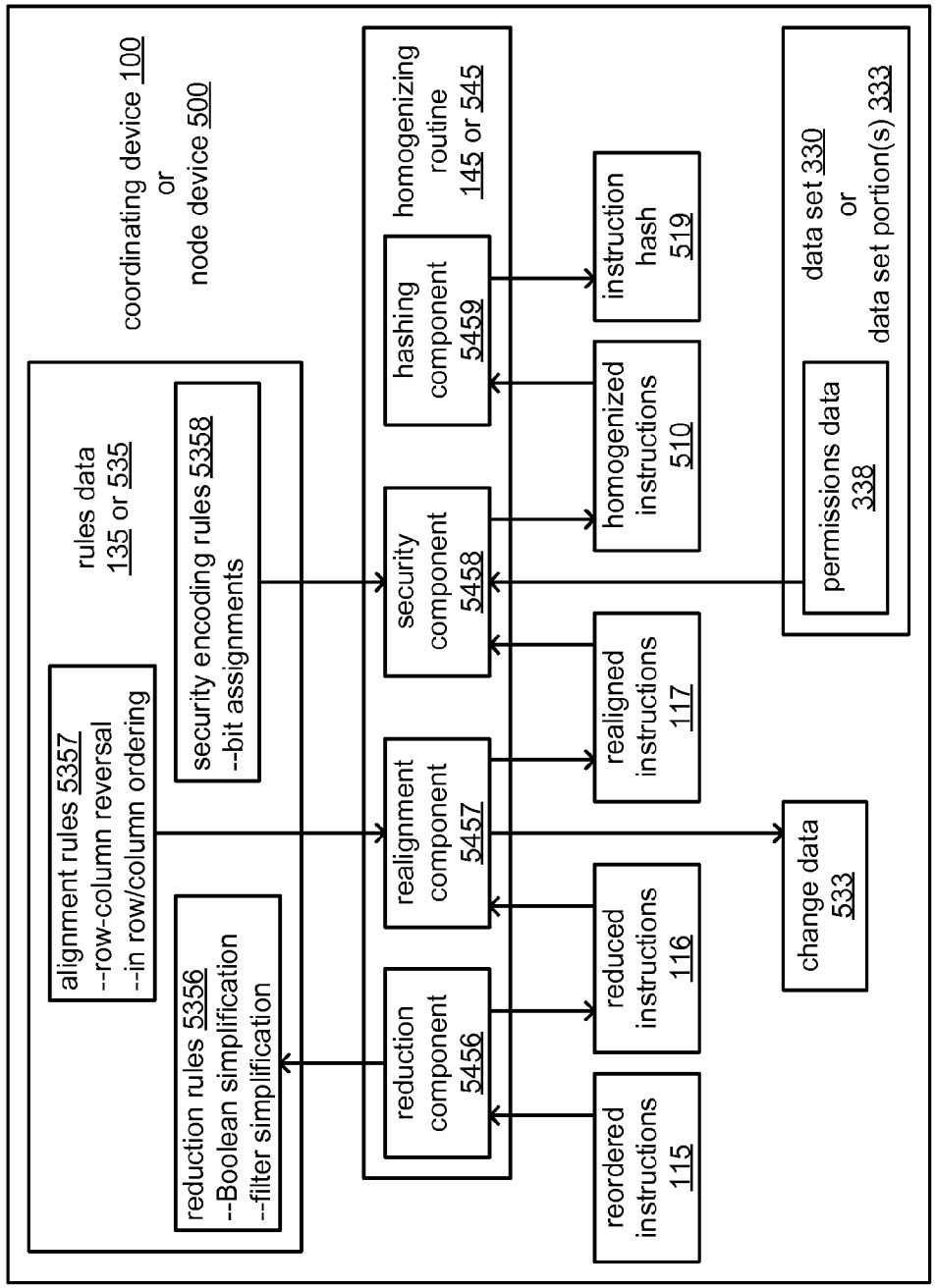

Referring to all three of FIGS. 2A-C, the control routine 140 of the query device 100 may include a homogenizing routine 145 for execution by the processor component 150 to homogenize the query instructions 110 to generate the homogenized instructions 510, and to then take the instruction hash 519 of the homogenized instructions 510. Alternatively or additionally, the control routine 540 of one or more of the node devices 500 may include a homogenizing routine 545 for execution by one or more of the processor components 550 to do so. As previously discussed, in various embodiments, such homogenization of the query instructions 110 and generation of the instruction hash 519 may be performed within either the query device 100 or within one or more of the node devices 500. FIGS. 3A and 3B, together, depict an example of homogenization of the query instructions 110 to generate the homogenized instructions 510 and of generating the instruction hash 519 from the homogenized instructions 510 within either the query device 100 or at least one of the node devices 500. More precisely, FIGS. 3A-B, together, depict an example architecture of either the homogenizing routine 145 or 545 making use of either the rules data 135 or 535, respectively, to homogenizing the query instructions 110. Also depicted is an example set of temporary data structures that may be used by the homogenizing routine 145 or 545 during such homogenization.

Turning more specifically to FIG. 3A, as depicted, the homogenizing routine 145 or 545 may include a translation component 5451 to interpret the expressions and syntax of executable instructions making up the query instructions 110 to determine whether the query instructions 110 are written in a selected archetypal language. If the query instructions 110 are not written in the selected archetypal language, then the translation component 5451 may convert the query instructions 110 into the selected archetypal language. In various embodiments, the query instructions 110 may be written in any of a variety of languages, including and not limited to, DS2, Java, MapReduce, Scala, SQL, SPARK or XML. The control routine 140 may be augmented in its functionality, including which languages it supports, by the addition of one or more add-on routines 142 to the control routine 140. Also, in various embodiments, the query instructions 110 may be written in a mixture of languages and/or various extensions of a language. However, as part of homogenizing the query instructions 110, there may be only a single particular language selected to be the archetypal language into which some or all of the query instructions 110 may need to be converted. By way of example, where the selected archetypal language is Java, the translation component 5451 may convert at least a portion of the query instructions 110 that are written in XML into Java by generating equivalent instructions in Java to replace the instructions written in XML. In so doing, the translation component 5451 may retrieve from the rules data 135 or 535 translation rules 5351 that specify particular translations between expressions, syntax, and/or formatting employed by different languages to provide indications of the correspondences between the manner in which an instruction and/or data may be expressed in one language versus another language. Upon completion of any such translation, the now translated form of the query instructions 110 may be stored as translated instructions 111, as depicted.

As also depicted, the homogenizing routine 145 or 545 may include a removal component 5452 to interpret the expressions and syntax of executable instructions making up the query instructions 110 (now in the form of the translated instructions 111) to identify objects to remove, including declarations for data and/or other items that are never used, and formatting instructions that have no effect on the data content of the results data 730. As appreciable to those skilled in the art, due to frequent reuse of database instructions between performances of database queries, the query instructions 110 may mistakenly include declarations of data types, data structures, variables, functions, procedures, etc. that are never assigned a value, never called, etc. Alternatively or additionally, the query instructions 110 may include instructions associated with setting the format of various data objects and/or the format by which data may be organized in the results data 730. Such formatting instructions may have no effect on the data content of the one or more data set portions 333 that may be searched for and retrieved from the data set 330, and/or what data content is taken from and/or derived from the one or more data set portions 333 for inclusion in the results data 730. In so removing such objects, the removal component 5452 may retrieve from the rules data 135 or 535 removal rules 5352 that specify conditions under which an object is deemed to be a declaration for something that is never used and/or conditions under which an instruction is deemed to be a formatting instruction (or other type of instruction) that has no effect on the data content of the results data 730. Upon completion of any such removals, the now redacted form of the query instructions 110 may be stored as redacted instructions 112, as depicted.

Below is a portion of an example embodiment of the query instructions 110 that includes objects that are declared, but not used, specifically the data item "bi65", and the data source items "bi27", "bi28" and "bi34". For sake of clarity, the declarations for these unused objects are highlighted with surrounding boxes.

```
<DataDefinitions>
    <DataDefinition dataSource="ds26" type="relational" name="dd3">
        <BusinessItems>
            <RelationalDataItem name="bi50" base="bi47"/>
            <RelationalDataItem name="bi48" base="bi35"/>
            <RelationalDataItem name="bi65" base="bi28"/>
        </BusinessItems>
        <RelationalQuery detail="false">
            <Axes>
                <Axis type="column">
                    <BusinessItem ref="bi50"/>
                    <BusinessItem ref="bi48"/>
                </Axis>
                <Axis type="page">
                </Axis>
            </Axes>
            <SortItems>
                <SortItem ref="bi48" sortDirection="ascending"/>
            </SortItems>
        </RelationalQuery>
    </DataDefinition>
</DataDefinitions>
<DataSources>
    <DataSource label="Mail Order Data" type="relational" name="ds26">
        <InMemoryResource resourceName="SBIP://METASERVER/Shared
            Data/LASR/VAFIT/Libraries/BIRD English LASR on
            VAFIT/MAILORDERDEMO(Table)" label="Mail Order Data"/>
        <BusinessItemFolder label="">
            <DataItem name="bi27" xref="CUSTNUM"/>
            <DataItem name="bi28" xref="NAME"/>
            <DataItem name="bi34" xref="PHONE"/>
            <DataItem name="bi35" xref="REGION"/>
            <DataItem name="bi47" xref="COST"/>
        </BusinessItemFolder>
    </DataSource>
</DataSources>
```

Presuming that these declarations for unused objects meet requirements specified in the removal rules 5352 for declarations that are to be removed, then the removal component 5452 may so remove these declarations for these unused objects. Thus, the highlighted lines declaring the data source items "bi27", "bi28" and "bi34" would be removed by the removal component 5452, along with a declaration of the data item "bi65" as associated with the data source item "bi28".

Also below is a portion of an example embodiment of the query instructions 110 that includes instructions specifying formatting for columns that have no effect on the data content within the one or more data set portions 333 that may be retrieved from the data set 330, specifically the two instruction specifying a "DOLLAR12.2" format. For sake of clarity, these two formatting instructions are highlighted with surrounding boxes.

```
<DataSources>
    <DataSource label="Mail Order Data" type="relational" name="ds26">
        <InMemoryResource resourceName="SBIP://METASERVER/Shared
            Data/LASR/VAFIT/Libraries/BIRD English LASR on
            VAFIT/MAILORDERDEMO(Table)" label="Mail Order Data"/>
        <BusinessItemFolder label="">
            <DataItem name="bi35" xref="REGION"/>
            <DataItem name="bi47" format="DOLLAR12.2"
                xref="COST"/>
            <DataItem name="bi98" format="DOLLAR12.2"
                xref="PRICE"/>
        </BusinessItemFolder>
    </DataSource>
</DataSources>
```

Presuming that these formatting instructions meet requirements specified in the removal rules 5352 for formatting instructions that are to be removed, then the removal component 5452 may so remove these formatting instructions declarations for these unused objects. Thus, the highlighted specifying the "DOLLAR12.2" format would be removed by the removal component 5452.

It should be noted that, in some embodiments, such removing of objects may be performed by the removal component 5452 in tandem with the translation component 5451 as at least a portion of the query instructions is translated from one language to another. More precisely, upon identifying an object that is to be removed, the removal component 5452 may cooperate with the translation component 5451 to cause the translation component 5451 to simply refrain from translating that object.

As further depicted, the homogenizing routine 145 or 545 may include a renaming component 5453 to interpret the expressions and syntax of executable instructions making up the query instructions 110 (now in the form of the redacted instructions 112) to identify objects to rename, such as names of variables. As appreciable to those skilled in the art, variables in any executable set of instructions may be named in accordance with any of a wide variety of naming conventions. As part of homogenizing the query instructions 110 to enable generation and effective use of the instruction hash 519 in comparisons to instruction hashes of earlier query instructions, the renaming component 5453 employs the same archetypal naming convention to rename objects in the query instructions 110 as was employed to rename objects in each of the earlier query instructions. Stated differently, to enable effective comparisons between the query instructions 110 and earlier query instructions through a comparison of their instruction hashes, the renaming component 5453 may supplant the differing naming conventions used in the query instructions 110 and in each of the earlier query instructions with a single archetypal naming convention to enable the same names to be generated for objects that correspond among these query instructions. In so doing, the renaming component 5453 may retrieve from the rules data 135 or 535 naming rules 5353 that specify aspects of the archetypal naming convention, including one or more of generating names based on the organization of one or more portions of data, generating names that include a numerical component that may be incremented or decremented as each name is generated, or modifying one or more generated names to resolve collisions among names.

In recognition of the fact that query instructions that set forth substantively similar database queries must necessarily set forth a search of the same data set, the single naming convention employed to supplant may be based on labels used as part of the indexing scheme by which data items are organized within that data set. Thus, for example, where the query instructions 110 set forth a database query that entails a search of the data set 330, the renaming component 5453 may generate new names with which to rename objects in the query instructions 110 that are based on labels used in the indexing scheme by which data items are organized within the data set 330. By way of example, portions of data and/or individual data items may be referenced through an index system that may include a row and/or a column along which each location is referred to with a label that may be made up of one or more text characters that are indicative of the what data items are associated with that location. Where a data set includes numerical data items that are associated with monetary amounts, locations along a row or a column may be labeled with text characters spelling out terms such as "cost", "fee", "tax", "price", "interest", "principal", etc. Indications of such labels may be present within the query instructions 110 as part of declarations of data types, variable, functions and/or procedures. The renaming component 5453 may employ such indications of such labels within the query instructions 110 to generate new names for various objects that are associated with each of such labels through those declaration instructions. Upon completion of such renaming of objects, the query instructions 110 with renamed objects may be stored as renamed object instructions 113, as depicted. Further, the renaming component 5453 may also store an indication of correlations between the names originally given to the renamed objects in the query instructions 110 and the new names generated for those renamed objects by the renaming component 5453.

Below is a portion of an example embodiment of the query instructions 110 that includes various declarations for objects that assign names to those objects and also associate each of those objects with a label of an indexing scheme by which data items are organized within the data set 330. Specifically, this example includes a set of six declarations of data items "bi27", "bi28", "bi34", "bi35", "bi47" and "bi77". As can be appreciated, such naming of these data items exemplifies a naming convention used in generating the query instructions 110 in which data items are named with a prefix made up of the letters "bi" followed by a unique numerical value. In some naming conventions employed in writing query instructions, the letters "bi" may be an abbreviation for "business item" such as an item of business data.

```
<DataSources>
    <DataSource label="Mail Order Data" type="relational" name="ds26">
        <InMemoryResource resourceName="SBIP://METASERVER/
        Shared
            Data/LASR/VAFIT/Libraries/BIRD English LASR on
            VAFIT/MAILORDERDEMO(Table)" label="Mail
            Order Data"/>
        <BusinessItemFolder label="">
            <DataItem name="bi27" xref="CUSTNUM"/>
            <DataItem name="bi28" xref="NAME"/>
            <DataItem name="bi34" xref="PHONE"/>
            <DataItem name="bi35" xref="REGION"/>
```

```
            <DataItem name="bi47" xref="COST"/>
            <DataItem name="bi77" xref="PRICE"/>
            <PredefinedDataItem calculation="totalCount" name="bi24"
                label="Frequency" format="COMMA"/>
            <CalculatedItem dataType="double" name="bi78"
                label="2 * Sales" usage="quantitative"
                format="COMMA12.2" aggregation="sum">
                <Expression>times(2.03,${bi77,raw})</Expression>
            </CalculatedItem>
            <DataItem name="bi70" xref="State">
                <GeoInfo geoType="external" coordinateSpace=
                "WGS84">
                    <Lookup property="latitude"
                        externalSource="us.primary.names"/>
                    <Lookup property="longitude"
                        externalSource="us.primary.names"/>
                    <Lookup property="polygonId"
                        externalSource="us.primary.names"/>
                    <Lookup property="mapId"
                        externalSource="us.primary.names"/>
                </GeoInfo>
            </DataItem>
            <Hierarchy name="bi76" label="RegionName">
                <Level ref="bi35"/>
                <Level ref="bi28"/>
            </Hierarchy>
            <RelationalFilterItem name="bi30">
                <Expression>gt(${bi77,raw},2.0)</Expression>
            </RelationalFilterItem>
        </BusinessItemFolder>
    </DataSource>
</DataSources>
```

As discussed, in some embodiments, the archetypal naming convention specified in the naming rules 5353 may be to employ the labels of the indexing scheme of the data set 330 that each of these data items is associated with as the basis of the new names by which each of these data items are renamed. Thus, for example, the data item that was originally named "bi27" and that was associated with the label "CUSTNUM" of the data set 330 is now renamed "bixCUSTNUM" based on that label, as below.

```
<DataSources>
    <DataSource label="Mail Order Data" type="relational" name=
    "dsx35f96fb1">
        <InMemoryResource resourceName="SBIP://METASERVER/
        Shared
            Data/LASR/VAFIT/Libraries/BIRD English LASR on
            VAFIT/MAILORDERDEMO(Table)" label="Mail
            Order Data"/>
        <BusinessItemFolder label="">
            <DataItem name="bixCUSTNUM" xref="CUSTNUM"/>
            <DataItem name="bixNAME" xref="NAME"/>
            <DataItem name="bixPHONE" xref="PHONE"/>
            <DataItem name="bixREGION" xref="REGION"/>
            <DataItem name="bixCOST" xref="COST"/>
            <DataItem name="bixPRICE" xref="PRICE"/>
            <PredefinedDataItem calculation="totalCount" name=
            "bixtotalCount"
                label="Frequency" format="COMMA"/>
            <CalculatedItem dataType="double" name="bix429f59d0"
                label="2 * Sales" usage="quantitative"
                format="COMMA12.2" aggregation="sum">
                <Expression>times(2.0,${bixPRICE,raw})
                </Expression>
            </CalculatedItem>
            <DataItem name="bixState" xref="State">
                <GeoInfo geoType="external" coordinateSpace=
                "WGS84">
                    <Lookup property="latitude"
                        externalSource="us.primary.names"/>
                    <Lookup property="longitude"
                        externalSource="us.primary.names"/>
                    <Lookup property="polygonId"
```

-continued

```
            externalSource="us.primary.names"/>
        <Lookup property="mapId"
            externalSource="us.primary.names"/>
      </GeoInfo>
    </DataItem>
    <Hierarchy name="bixREGIONNAME" label="RegionName">
        <Level ref="bixREGION"/>
        <Level ref="bixNAME"/>
    </Hierarchy>
    <RelationalFilterItem name="bixa05413aa">
        <Expression>gt(${bixPRICE,raw},2.0)</Expression>
    </RelationalFilterItem>
    </BusinessItemFolder>
  </DataSource>
</DataSources>
```

As exemplified here, in some embodiments, where there is widespread use of a naming convention that includes such prefixes (or alternatively, suffixes), the archetypal naming convention specified in the naming rules 5353 may be selected to embrace such use of prefixes (or alternatively, suffixes) in generating the new names by which objects may be renamed. Further, in such an archetypal naming convention, the prefix (or alternatively, the suffix) may be augmented with an additional characters or other element to ensure that there can be no collision between a new name generated as part of renaming objects and a name already originally given to another object in the query instructions. Thus, as exemplified above, the prefix "bi" may be augmented with the letter "x" to create new the new prefix "bix" as part of renaming objects with the "bi" prefix.

However, despite the augmentation of portions of names with particular extra elements and/or other steps to attempt to avoid collisions between names, it may still be the case that a collision between two new names by which two different objects are to be renamed may still occur. This may arise, for example, where perhaps similar labels are used in two different parts of the indexing scheme of the data set 330 such that basing new names on labels of that indexing scheme would result in the generation of the same new name for two different objects. In some embodiments, this may be resolved by appending a unique numeric value to at least one of the new names. Where the situation arises that more than two of the new names, the numeric value appended to each may be incremented as part of providing a unique numerical value to each.

In some embodiments, the generating of new names by the renaming component 5453 based on labels of the indexing scheme of the data set 330 may result in the generation of a label that is deemed to be too long. In some embodiments, a hash may be taken of such an excessively long newly generated name to create an alternate new name made up of a specific quantity of characters of that hash. This is exemplified in the above example where the name "ds26" in the declaration for "Mail Order Data" would have been replaced with a name that was deemed too long, and so the new name by which "ds26" is replaced is made up of the same prefix "ds" augmented with a letter "x", and then followed by a string of alphanumeric characters of the hash taken of the new name that was deemed to be too long.

As still further depicted, the homogenizing routine 145 or 545 may include a reforming component 5454 to interpret the expressions and syntax of executable instructions making up the query instructions 110 (now in the form of the renamed object instructions 113) to identify mathematical operators to replace with archetypal mathematical operators. In so doing, the reforming component 5454 may retrieve from the rules data 135 or 535 reforming rules 5354 that specify the archetypal mathematical operators, what other mathematical operators are to be replaced with an archetypal mathematical operator, and what corresponding change is to be made to one or more operands associated with mathematical operators that are so replaced. In some embodiments, the archetypal mathematical operators may be selected to enable a subsequent commutative reordering of the mathematical operators and/or operands associated with an instruction. Where there are nested operators and operands (e.g., operators and operands within nested sets of parentheses) defining a relatively complex tree of operators, such commutative reordering may entail at least a partial flattening of the tree to reduce its complexity to fit within selected archetypal limits. Below is a set of examples of replacing mathematical operators in the query instructions with archetypal mathematical operators that may be specified in the reforming rules 5354.

```
a < b converted to b > a
lt(a,b) converted to gt(b,a)
a <= b converted to b >= a
le(a,b) converted to ge(b,a)
a <> b is converted to not(a = b)
ne(a,b) is converted to not(eq(a,b))
a notin(b,c) is converted to not(a in (b,c))
notin(a,'b','c') is converted to not(in(a,'b','c'))
a betweenInclusive 3,5 is converted to (a >= 3) && (b <=5)
betweenInclusive(a,3,5) is converted to and(ge(a,3),le(b,5))
a betweenExclusive 3,5 is converted to (a > 3) && (b < 5)
betweenExclusive(a,3,5) is converted to and(gt(a,3),lt(b,5))
a notBetweenInclusive 3,5 is converted to !((a >= 3) && (b <=5))
notBetweenInclusive(a,3,5) is converted to not(and(ge(a,3),le(b,5)))
a notBetweenExclusive 3,5 is converted to !((a > 3) && (b < 5))
notBetweenExclusive(a,3,5) is converted to not(and(gt(a,3),lt(b,5)))
int(a) is converted to round(a,0)
```

As can be appreciated in this set of examples, the replacement of at least some of the mathematical operators may entail a reordering of the operands associated with the replaced mathematical operators. Thus, in some embodiments, the reforming component 5454 may cooperate with a reordering component 5455 of the homogenizing routine 145 or 545, to effect such reordering of such operands. Upon completion of any such replacement of mathematical operators and corresponding reordering of operands, the now reformed form of the query instructions 110 may be stored as reformed instructions 114, as depicted.

However, the reordering component 5455 may additionally interpret the expressions and syntax of executable instructions making up the query instructions 110 (now in the form of the reformed instructions 114) to identify and combine detail filters implemented as comparisons between numerical values. More precisely, the reordering component 5455 may identify each instruction that employs the result of a comparison between two or more numeric values as the basis for selecting one or more portions of data of the data set 330 to retrieve from the data set 330. The reordering component 5455 may then combine all of the identified ones of such instructions into a single detail filter where the different comparisons may be combined with one or more AND operators and/or one or more other operators. Further, the reordering component 5455 may commutatively reorder the mathematical operators and/or associated operands. Alternatively or additionally, the reordering component 5455 may similarly interpret the expressions and syntax of executable instructions making up the query instructions 110 (now in the form of the reformed instructions 114) to identify and combine post-aggregate filters implemented as comparisons between numerical values. More precisely, the reordering component 5455 may identify each instruction that employs the result of a comparison between two or more numeric values as the basis for selecting one or more numeric values resulting from one or more aggregation operations performed on the one or more data set portions 333 to become part of the results data 730. The reordering component 5455 may then combine all of the identified ones of such instructions into a single post-aggregate filter where the different comparisons may be combined with one or more AND operators and/or one or more other operators. Again, the reordering component 5455 may commutatively reorder the mathematical operators and/or associated operands. In so doing, the reordering component 5455 may retrieve from the rules data 135 or 535 reordering rules 5355 that specify the archetypal or of mathematical operators and/or operands. Again, such commutative reordering may be enabled by the earlier replacement of mathematic operators with archetypal mathematic operators by the reforming component 5454.

Apart from replacing mathematical operators, the reforming component may also interpret expressions and/or syntax of the query instructions 110 to identify formatting instructions that may have an effect on at least the numerical values that are selected for inclusion in the results data 730, such formatting rules specifying time and/or date formats. By way of example, the reforming rules 5354 may specify an archetypal time format and/or an archetypal date format, and the reforming component 5454 may replace formatting instructions that specify other time and/or date formats with instructions that specify the archetypal time and/or date format to prevent accidental misinterpretation of various time and/or date values.

Apart from reordering mathematical operators and/or associated operands, the reordering component may also interpret expressions and/or syntax of the query instructions 110 following the renaming of various objects by the renaming component 5453 to reorder those objects into a selected archetypal order based on the new names given to those objects. By way of example, the reordering rules 5355 may specify the use of an alphabetical order in reordering objects by their new names, and the reordering component 5455 may reorder a set of declarations of renamed variables into alphabetical order based on the new names assigned to them by the renaming component 5453. Upon completion of any such reordering of objects, the now reordered form of the query instructions 110 may be stored as reordered instructions 115, as depicted.

Turning more specifically to FIG. 3B, as depicted, the homogenizing routine 145 or 545 may include a reduction component 5456 to interpret the expressions and syntax of executable instructions making up the query instructions 110 (now in the form of the reordered instructions 115) to identify Boolean operators to replace with archetypal Boolean operators. In so doing, the reduction component 5456 may retrieve from the rules data 135 or 535 reduction rules 5356 that specify the archetypal Boolean operators, what other Boolean operators are to be replaced with an archetypal Boolean operator, and what corresponding change is to be made to one or more operands associated with Boolean operators that are so replaced. In some embodiments, the archetypal Boolean operators may be selected to enable a subsequent commutative reordering of the Boolean operators and/or operands associated with an instruction. The reduction component 5456 may also commutatively reorder Boolean operators and/or associated operands as part of reducing the complexity of one or more Boolean expressions within the query instructions 110. Upon completion of any such replacement of Boolean operators and corresponding reordering, the now reduced form of the query instructions 110 may be stored as reduced instructions 116, as depicted.

As also depicted, the homogenizing routine 145 or 545 may include a realignment component 5457 to interpret the expressions and syntax of executable instructions making up the query instructions 110 (now in the form of the reduced instructions 116) to identify the manner in which different axes of the indexing scheme of the data set 330 are used in searching for portions of data therein. Stated differently, the realignment component 5457 may identify instances of where the query instructions 110 specify a search of the data set 330 that is to proceed along an axis other than a selected archetypal axis. In so doing, the realignment component 5457 may retrieve from the rules data 135 or 535 alignment rules 5357 that specify the archetypal axis along which searches are to be performed or the manner in which the archetypal axis is to be identified. Where the realignment component 5457 identifies instructions within the query instructions 110 specifying a search of the data set 330 that is to proceed along an axis other than the archetypal axis for the data set 330, the realignment component 5457 may reform those instructions with the query instructions 110 to specify the search to proceed along the archetypal axis for the data set 330. By way of example where the data set 330 employs an indexing scheme that includes a row and a column to organize data items, if the row is the archetypal axis along which to search through the data set 330, but the query instructions 110 specify proceeding along the column, then the realignment component 5457 may reform those instructions to perform that search along the row. Upon completion of any such reformation of searching instructions, the query instructions 110 with the now realigned search(es) may be stored as realigned instructions 117, as depicted. Alternatively or additionally, the realignment component 5457 may store indications of such realignments of one or more searches as part of the change data 533.

As further depicted, the homogenizing routine 145 or 545 may include a security component 5458 to retrieve indications of the security permissions of the user of the query device 100. In some embodiments, the user of the query device 100 may be required to log into the query device 100 and/or to otherwise provide an indication of their identity. Alternatively or additionally, the geographic location of the query device 100 and/or other identifying information associated with the query device 100, itself, may serve as a proxy for explicit identification of the user of the query device 100 that may be provided by the user of the query device 100. Regardless of the particular manner in which the user of the query device 100 is identified, the security component 5458 may retrieve from the data set 330 permissions data 338 that specifies what portion(s) of the data set 330 the user of the query device 100 has permission to access. Alternatively or additionally, the query instructions 110 may have been automatically augmented with an indication of the permissions associated with the user and/or with the query device 100 during entry of the query instructions 110 into the query device 100. In some embodiments, such an indication may take the form of a clause added to the query instructions 110 that specifies portions of the data set 330 to which access is to be permitted and that serves as a filter to control which portions of the data set 330 to include in any results. The security component 5458 may append a byte, a word, a doubleword, etc. onto the query instructions 110 (now in the form of the realigned instructions 117) in which each bit corresponds to a different portion of the data set 330 for which there may be different security permissions. The security component 5458 may assign a value to each of those bits indicative of whether the user of the query device 100 has permission to access the portion of the data set 330 that corresponds to that bit, thereby encoding the security permissions of the user therein. Following such encoding of security permissions, the security component 5458 may then store the resulting version of the query instructions 110 as the homogenized instructions 510.

It should be noted that, despite the depiction and discussion of the performance of various changes to the query instructions 110 in a particular order to generate the homogenized instructions 510, that other embodiments are possible in which the aforementioned changes to the query instructions 110 may be made in a different order. Alternatively or additionally, a subset of the aforementioned changes to the query instructions 110 may be performed at least partly in parallel, and that such parallel performance of different ones of the aforementioned changes may be carried out by different one of the processor components 550 of different ones of the node devices 500 in some embodiments. Thus, although a particular set of temporary data structures 111-117 has been described as being generated during the course of performing the aforementioned changes in a particular order, other embodiments are possible in which the query instructions 110 may be temporarily maintained in one or more different intermediate states during performance of the aforementioned changes in either the same order or a different order.

As still further depicted, the homogenizing routine 145 or 545 may include a hash component 5459 to take the instruction hash 519 of the homogenized instructions 510. The hash algorithm employed in taking the instruction hash 519 may be any of a variety of types of hash algorithm, including and not limited to one of the Secure Hash Algorithm 0 (SHA-0), SHA-1, SHA-2, or SHA-3 hash algorithms that are widely known and used. More precisely, a type of hash algorithm may be selected to ensure that it is highly unlikely for two different query instructions to be associated with the same instruction hash.

Figure 4A:
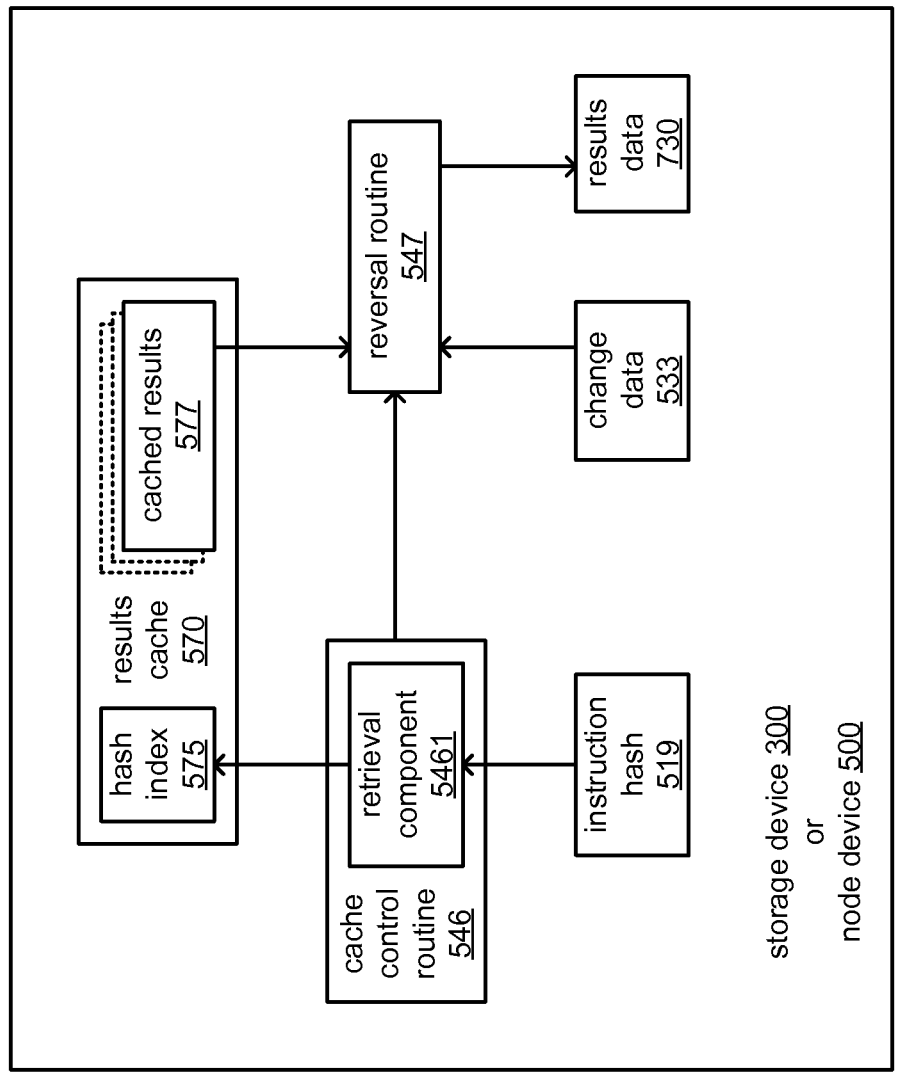
FIGS. 4A and 4B illustrate examples of attempting to identify cached results and generating results data.
Figure 4B:
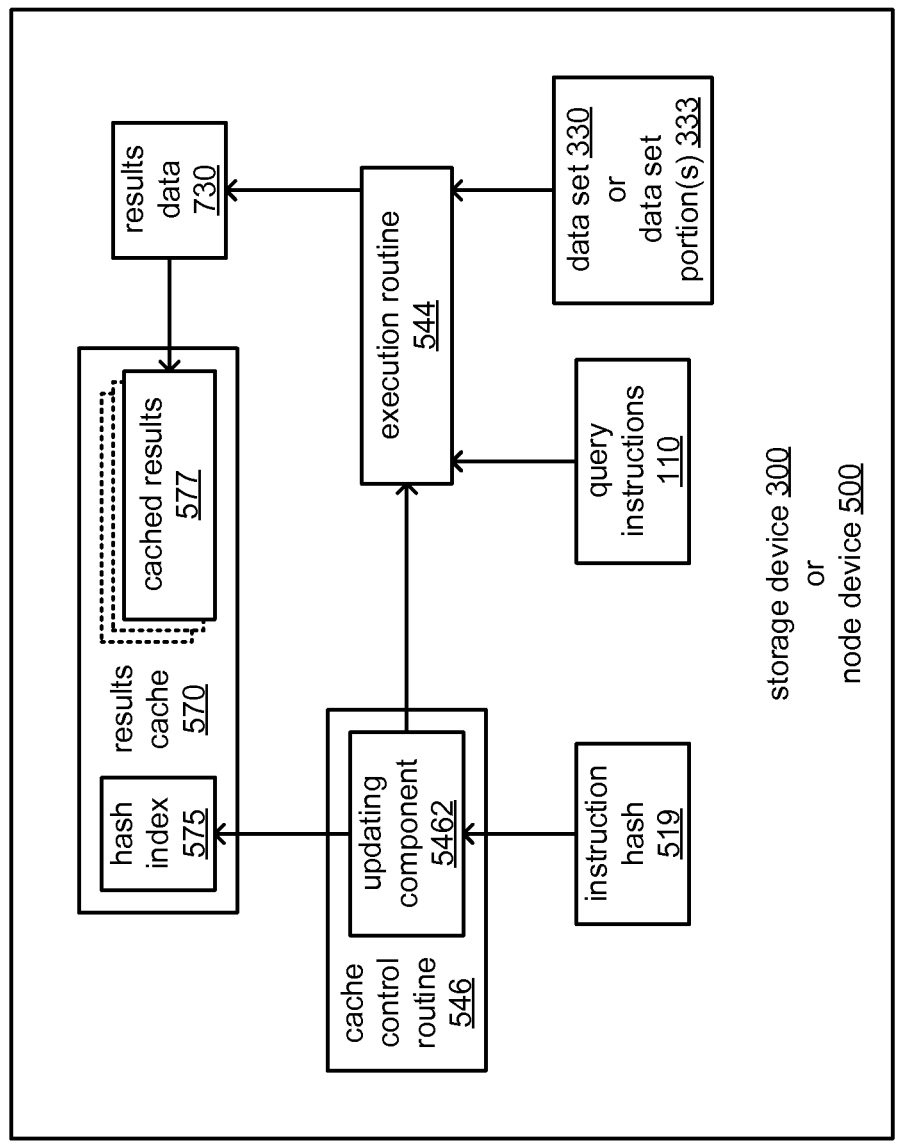

Returning to FIGS. 2B and 2C, the control routine 540 of one or more of the node devices 500 may include a cache routine 546 for execution by one or more of the processor components 550 to compare the instruction hash 519 to other instruction hashes within the hash index 575 of the results cache 570. The control routine 540 may also include a reversal routine 547 for execution by one or more of the processor component 550 to perform, on a cached result that may be identified within the results cache 570, a reversal of at least part of the homogenization performed on the query instructions 110 to generate the homogenized instructions 510. The control routine 540 may further include an execution routine 544 for execution by one or more of the processor components 550 to execute at least a portion of the query instructions 110 as part of performing the new database query set forth in the query instructions 110 if a cached result from which to generate the results data 730 cannot be identified in the results cache 570. FIGS. 4A and 4B, together, depict an example of employing the instruction hash 519 to attempt to identify a cached result within the results cache 570, and either employing the cached result to generate the results data 730 or executing the query instructions 110 to do so.

Turning more specifically to FIG. 4A, as depicted, the cache routine 546 may include a retrieval component 5461 that performs a comparison of the instruction hash 519 to each instruction hash present within the hash index 575 of the results cache 570. Presuming that an instruction hash is found within the hash index 575 that matches the instruction hash 519 such that there is a one of the cached results 577 that may be used to generate the results data 730, the cache routine 546 may trigger the reversal routine 547 to use that one of the cached results 577 to do so. The reversal routine 547 may refer to the indications of changed names effected by the renaming component 5453 and/or of instances of realignment of axes effected by the realignment component 5457 from the change data 533 to effectively perform a reversal of those portions of the homogenization of the query instructions 110 on the retrieved one of the cached results 577 as part of generating the results data 730. In this way, the results data 730 employs the same names originally given to various objects in the query instructions 110, and does not employ the names generated by the renaming component 5453. Also, in this way, the results data 730 includes one or more portions of data retrieved from the data set 330 that are organized among multiple axes in the manner specified in the query instructions 110, and not organized in the realigned manner effected by the realignment component 5457.

Turning more specifically to FIG. 4B, as depicted, the cache routine 546 may include an updating component 5462 that generates a new entry within the results cache 570 in response to the retrieval component 5461 not finding an instruction hash within the hash index 575 that matches the instruction hash 519. As has been discussed, a lack of a matching instruction hash within the hash index 575 indicates that none of the cached results 577 of earlier database queries are able to be used to generate the results data 730. Thus, the updating component 5462 selects a location within the hash index 575 into which to store the instruction hash 519 as a new index to the new entry. As recognizable to those skilled in the art of a cache management, where creating a new entry in the results cache 570 entails selecting one of the existing entries to be removed from the results cache 570, any of a variety of algorithms may be employed by the updating component 5462 to select one of the existing entries. Further, in some embodiments, the updating component 5462 may selectively remove one or more entries in accordance with one or more cache policies to prevent the contents of the results cache 570 from becoming stale. By way of example, entries present within the results cache 570 for more than a predetermined period of time may be removed.

In addition to generating a new entry within the results cache 570, the updating component 5462 may trigger the execution routine 544 to proceed with executing the query instructions 110 to generate the results data 730. As has been discussed, in some embodiments, such execution of the query instructions 110 may entail executions of different portions thereof by one or more of the node devices 500 and/or one or more of the storage devices 300. In such embodiments, the processor component(s) 350 of one or more storage devices 300 may execute a portion of the query instructions 110 that entails searching the data set 330 to retrieve the one or more data set portions 333 therefrom, and the processor component(s) 550 of one or more of the node devices 500 may execute a portion of the query instructions 110 that entails performing various aggregation operations on the retrieved one or more data set portions 333. However, as has also been discussed, in other embodiments in which the one or more node devices 500 directly store and maintain the data set 330, the processor component(s) 550 of one or more of the node devices 500 may execute a portion of the query instructions 110 that entails searching the data set 330 to retrieve the one or more data set portions 333 therefrom in lieu of there being any of the storage devices 300 to do so, and in addition to performing aggregation operations thereon. Upon completion of the execution of the query instructions 110, the execution routine 544 may then store the results data 730 in the new entry created within the results cache 570 as a new one of the cached results 577.

In various embodiments, each of the processor components 150, 350, 550, and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked. However, in a specific embodiment, the processor component 550 of one or more of the node devices 500 may incorporate multi-threaded capabilities that may be implemented with multiple processing cores such that one or more additional threads to separately process one or more sets of organized subportions 531 may be distributed among multiple processing cores.

In various embodiments, each of the storages 160, 360, 560, and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in a specific embodiment, the storage 360 of one or more of the storage devices 300 that stores a data set portion 331 or the storage 560 of one or more of the node devices 500 that stores a data set portion 331 may be implemented with a redundant array of independent discs (RAID) of a RAID level selected to provide fault tolerance to prevent loss of a data set portion 331 and/or to provide increased speed in accessing a data set portion 331.

In various embodiments, the network interfaces 190, 390, 590 and 790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. However, in a specific embodiment, the network interface 390 of one or more of the storage devices 300 that stores a data set portion 331 or the network interface 590 of one or more of the node devices 500 that stores a data set portion 331 may be implemented with multiple copper-based or fiber-optic based network interface ports to provide redundant and/or parallel pathways in exchanging data set subportions 332.

Figure 5A:
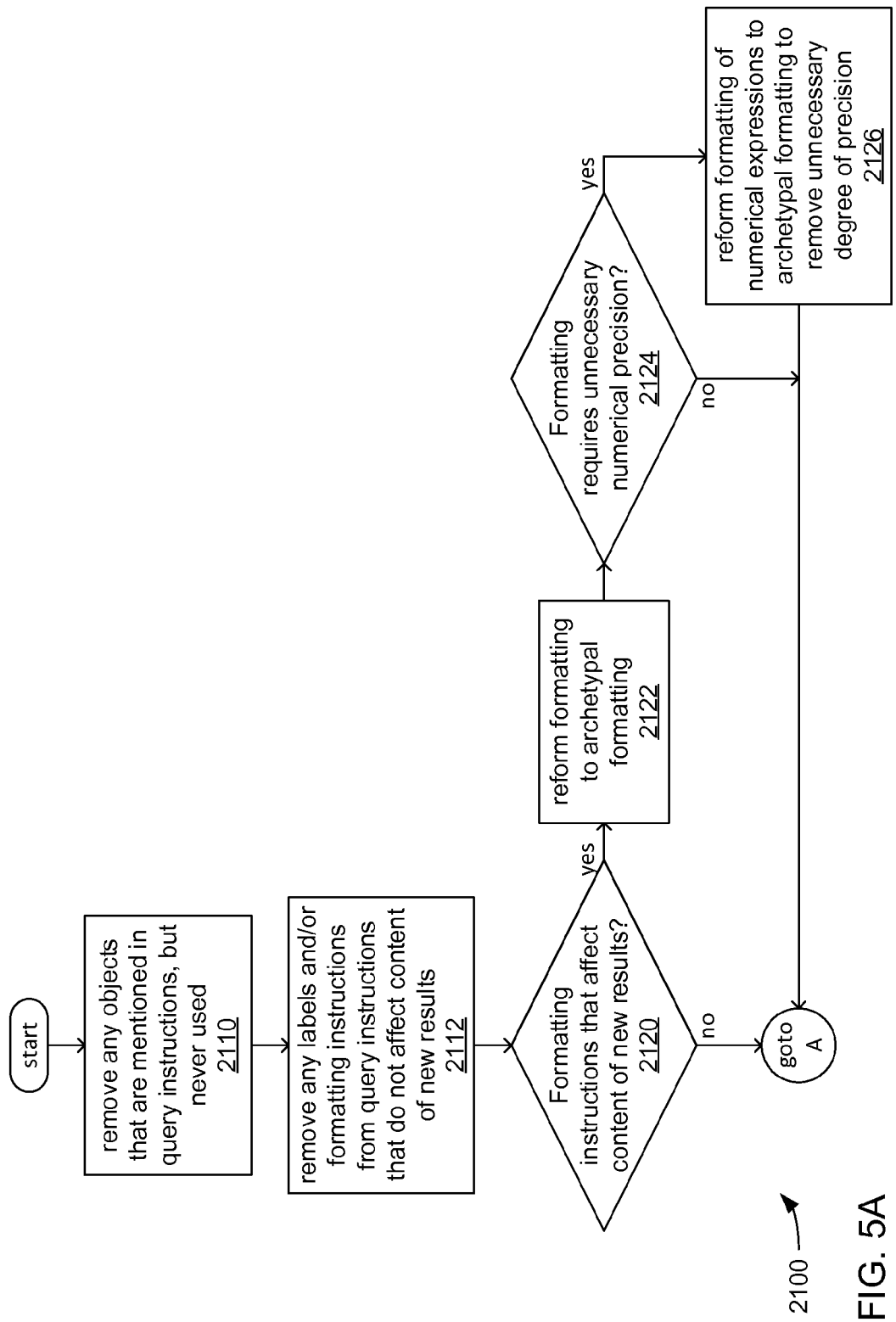
FIGS. 5A, 5B and 5C, together, illustrate an example embodiment of a logic flow of homogenizing and taking an instruction hash of query instructions.
Figure 5B:
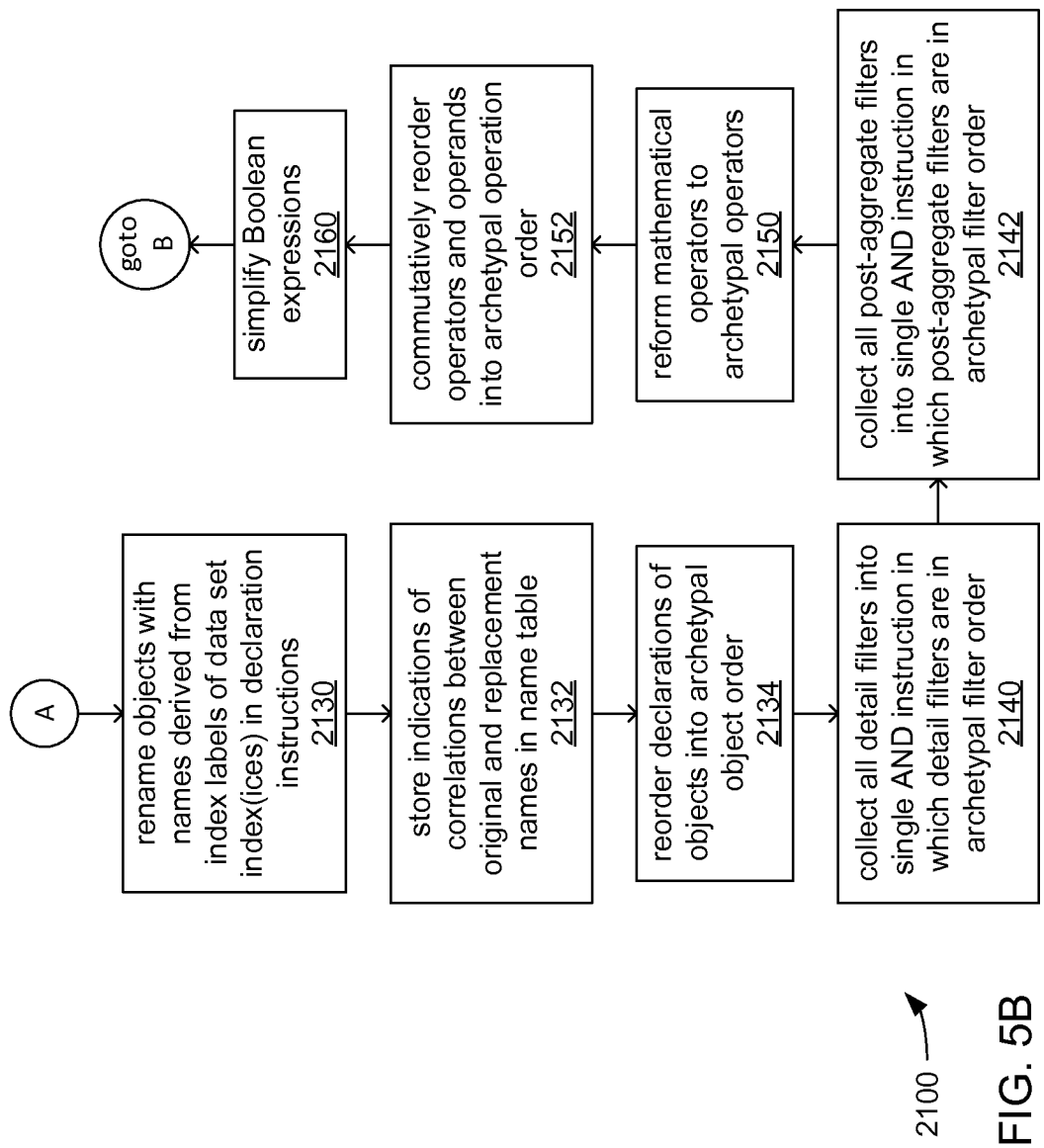
Figure 5C:
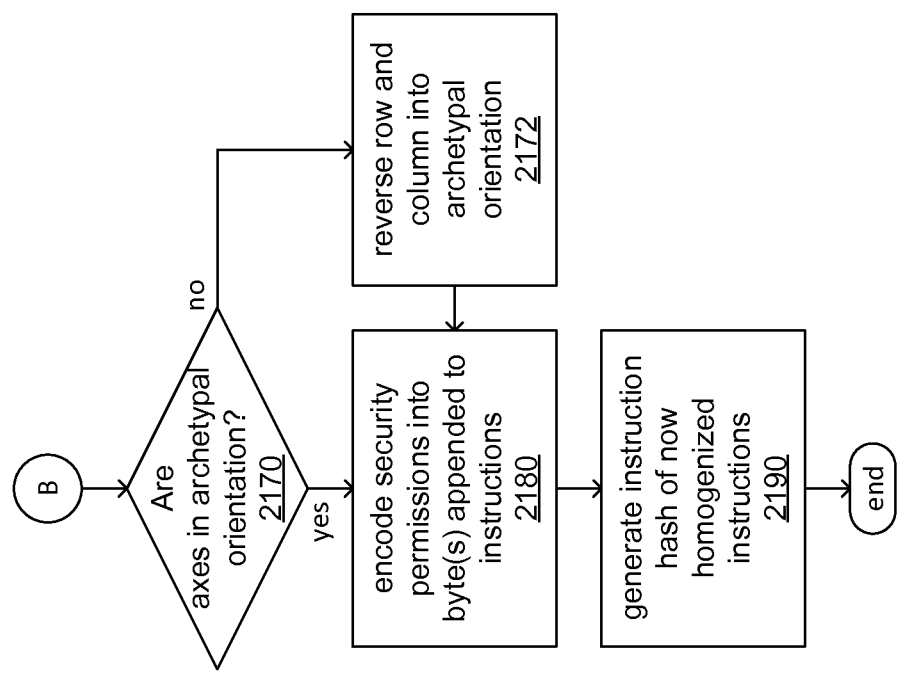

FIGS. 5A, 5B and 5C, together, illustrate an example embodiment of a logic flow 2100. The logic flow 2100 may be representative of some or all of the operations executed by one or more embodiments described herein. More specifically, the logic flow 2100 may illustrate operations performed by the processor components 150 and/or 550 in executing the control routines 140 and/or 540, and/or performed by other component(s) of the query device 100 and/or at least one of the node devices 500, respectively.

At 2110, a processor component of a device (e.g., the processor component 150 of the query device 100 or the processor component 550 of one or more of the node devices 500, respectively) may interpret query instructions setting forth a new database query (e.g., the query instructions 110) to identify and remove any objects mentioned within the query instructions, but which are never used. As has been discussed, such a new database query may be performed as part of a larger database task to analyze past events and/or to make a forecast of future events.

At 2112, the processor component may interpret the query instructions to identify and remove formatting instructions that have no bearing on what data items are contained in the new results of the new database query (e.g., in the new results to be represented by the results data 730). As has been discussed, there may be expressions such as instructions to impose a particular format on various data items in the new results that in no way affect what data items would be retrieved from a data set (e.g., the data set 330) to generate the new results.

At 2120, the processor component may interpret the query instructions to check whether the query instructions including expressions such as formatting instructions that do affect what data items would be retrieved from the data set to generate the new results. As has been discussed, the query instructions may specify particular numerical formatting that may specify an unnecessarily large bit width (e.g., byte, word, doubleword, etc.). If, the query instructions are found to include such formatting instructions, then the processor component may reform such formatting instructions to specify selected archetypal formatting at 2122.

At 2124, the processor component interprets the query instructions to check whether any of the formatting instructions specify an unnecessarily high degree of numerical precision. If, the query instructions are found to include such formatting instructions, then the processor component may reform such formatting instructions to specify selected archetypal formatting at 2126 that removes such a requirement for an unnecessarily high degree of precision.

Following the reformation of the query instructions to remove the requirement for an unnecessarily high degree of precision at 2126, or following a determination at 2124 that there are no formatting instructions require an unnecessarily high degree of precision, or following a determination at 2120 that there are no formatting instructions that do affect what data items would be retrieved, the processor component may interpret the query instructions at 2130 to identify objects to be renamed. More precisely, at 2130, the processor component may rename one or more variables and/or other objects with names derived from labels that serve as part of the indexing scheme of the data set by which a particular data item within the data set may be specified. As has been discussed, such labels of such an indexing scheme may be made up of text that may be at least somewhat descriptive of data items within particular portions of the data set.

At 2132, the processor component may store indications of any of such renaming in a change data (e.g., the change data 533). More precisely, the processor component may store indications of correlations between names originally given to objects within the query instructions and the new names given to those objects by the processor component as part of performing such renaming. Also, at 2134, the processor component may then reorder the declarations of those named and/or renamed objects in accordance with an archetypal order of objects based on one or more canonical rules. As has been discussed, such an archetypal order may be alphabetical.

At 2140, the processor component may interpret the query instructions to identify any detail filters that serve to select portions of the data set to be retrieved from the data set. The processor component may then combine all of such detail filters using an AND operator into a single detail filter instruction, and may arrange those detail filters within that single detail filter instruction in an archetypal order of detail filters based on one or more canonical rules.

At 2142, the processor component may similarly interpret the query instructions to identify any post-aggregate filters that serve to select particular numeric results of one or more aggregation calculations to include in the new results. The processor component may similarly combine all of such post-aggregate filters using an AND operator into a single post-aggregate filter instruction, and may arrange those post-aggregate filters within that single post-aggregate filter instruction in an archetypal order of post-aggregate filters based on one or more canonical rules.

At 2150, the processor component may interpret the query instructions to identify mathematical expressions. The processor component may reform one or more of those mathematical expressions by replacing mathematical operators with selected archetypal mathematical operators and/or by replacing operands with negated or inverted forms of those operands. As previously discussed, such reformation of mathematical operations may be performed to enable subsequent commutative reordering of mathematical operators and/or operands into an order that is in accordance with one or more canonical rules. At 2152, the processor component may perform such commutative reordering.

At 2160, the processor component may similarly perform a simplification of Boolean expressions. Specifically, the processor component may replace the Boolean operators with selected archetypal Boolean operators. The processor component may then also perform commutative reordering of Boolean operators and/or associated operands in accordance with one or more canonical rules.

At 2170, the processor component may interpret the query instructions to check whether the manner in which the query instructions specify a search of the data set to be performed entails using at least two of the axes of the indexing scheme of the data set in a manner that is in accordance with one or more canonical rules. If not, then the processor component may modify the query instructions to reverse the manner in which such searching is to be done relative to the at least two axes at 2172.

Regardless of whether such a reversal of at least two axes is performed, at 2180, the processor component may encode an indication of the security permissions associated with the person associated with the query instructions (e.g., the user of the query device 100) into one or more bytes. As has been discussed, the processor component may append the one or more bytes to the query instructions or otherwise augment the query instructions with the one or more bytes.

At 2190, the processor component of the same device, or of a different device (e.g., a different one of the node devices 500) may generate an instruction hash of the query instructions as now homogenized (e.g., the homogenized instructions 510).

Figure 6:
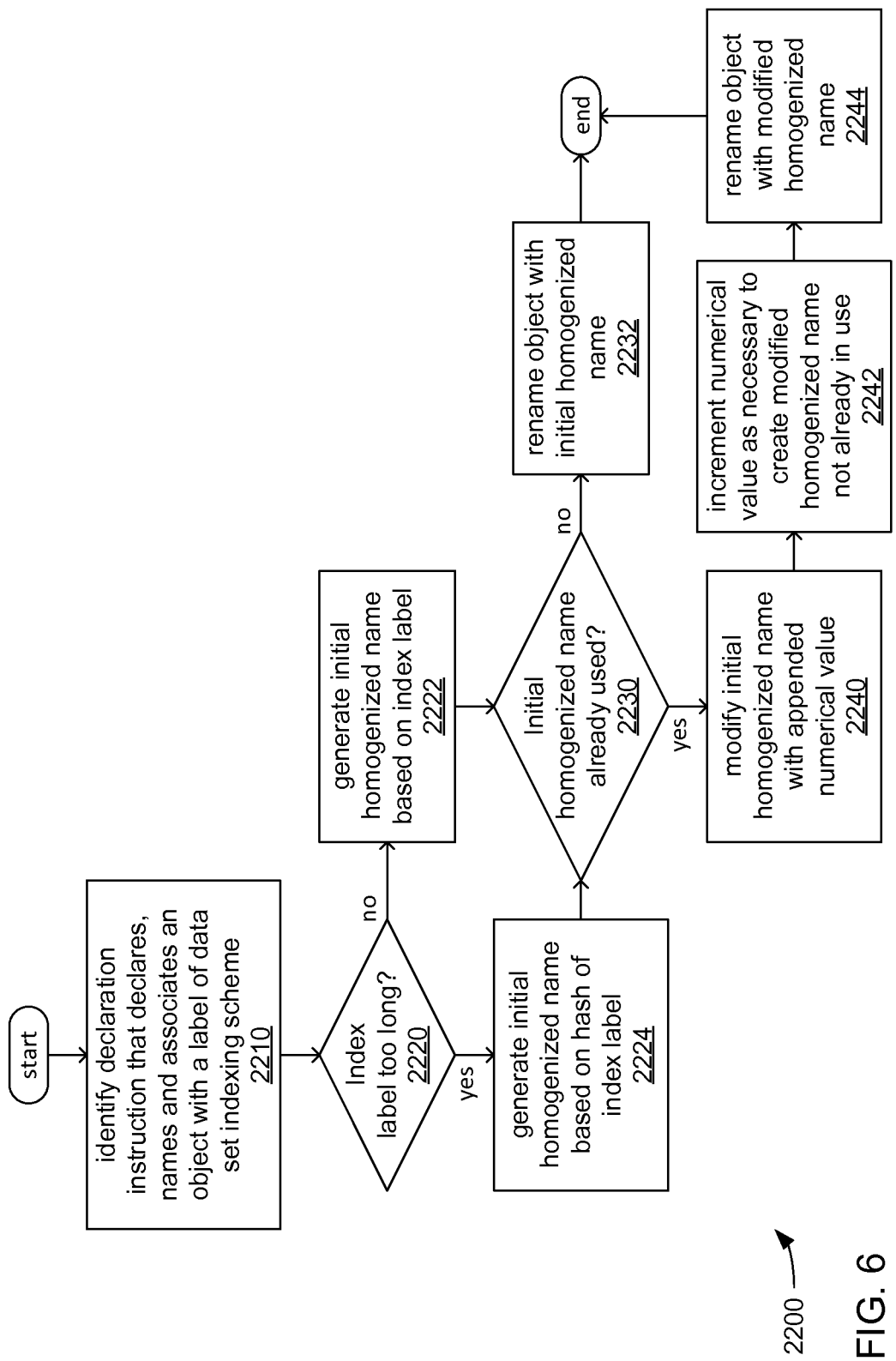
FIG. 6 illustrates another example embodiment of a logic flow of renaming objects in query instructions.

FIG. 6 illustrates an example embodiment of a logic flow 2200. The logic flow 2200 may be representative of some or all of the operations executed by one or more embodiments described herein. More specifically, the logic flow 2200 may illustrate operations performed by the processor components 150 and/or 550 in executing the control routines 140 and/or 540, and/or performed by other component(s) of the query device 100 and/or at least one of the node devices 500, respectively.

At 2210, a processor component of a device (e.g., the processor component 150 of the query device 100 or the processor component 550 of one or more of the node devices 500, respectively) may interpret query instructions setting forth a new database query (e.g., the query instructions 110) to identify a declaration instruction that declares, names and associates an object with a label belonging to an indexing scheme used to specify data items within a data set (e.g., an item of data within the data set 330). As has been discussed, such labels of such an indexing scheme may be made up of text that may be at least somewhat descriptive of data items within particular portions of the data set (e.g., within a row, column or other dimension of a multi-dimensionally indexed data set).

At 2220, the processor component may check whether the label of that indexing scheme is too long such that the label includes more than a selected maximum quantity of characters. If the label is not too long, then the processor component may generate an initial homogenized name for the object based on the label at 2222. However, if the label is too long, then the processor component may generate an initial homogenized name for the object based on a hash taken of the characters making up the label at 2224.

Regardless of the manner in which the initial homogenized name is generated, at 2230, the processor component may check whether the initial homogenized name is already in use as a homogenized name for another object. If not, then the initial homogenized name becomes the homogenized name by which the object is renamed at 2232.

However, if the initial homogenized name is already in use, then the processor component may modify the initial homogenized name by appending a numerical value to it at 2240. At 2242, the processor component may then increment that numerical value one or more times as needed to create a version of the initial homogenized name that is not already in use as a homogenized name for another object. Upon arriving at a version of the initial homogenized name that is not already in use through such incrementing, if necessary, the now modified initial homogenized name becomes the homogenized name by which the object is renamed at 2244.

Figure 7:
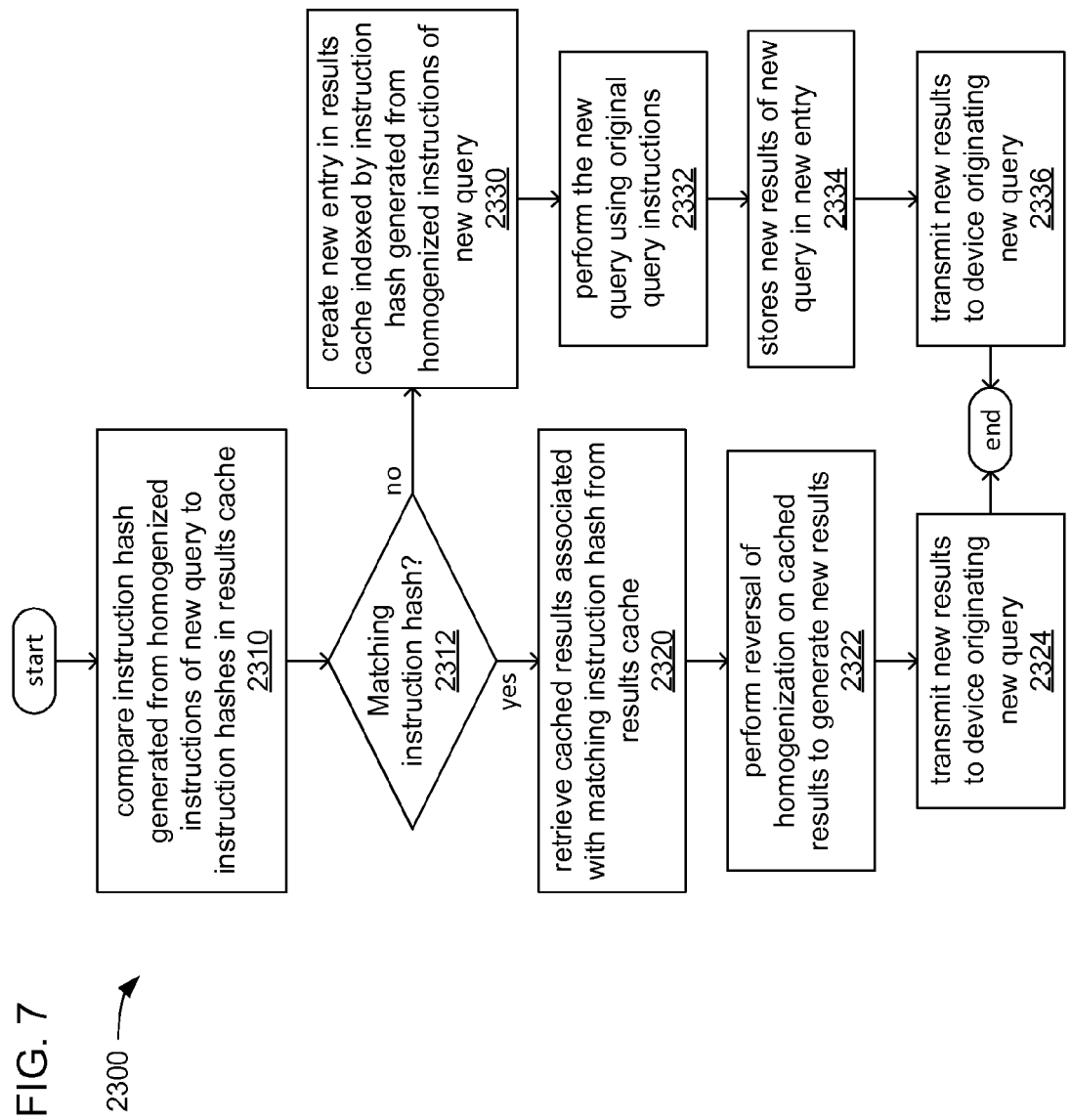
FIG. 7 illustrates an example embodiment of a logic flow of attempting to identify cached results and generating results data.

FIG. 7 illustrates an example embodiment of a logic flow 2300. The logic flow 2300 may be representative of some or all of the operations executed by one or more embodiments described herein. More specifically, the logic flow 2300 may illustrate operations performed by the processor components 350 and/or 550 in executing the control routines 340 and/or 540, and/or performed by other component(s) of at least one of the storage devices 300 and/or at least one of the node devices 500, respectively.

At 2310, a processor component of a device (e.g., the processor component 350 of one or more of the storage devices 300 or the processor component 550 of one or more of the node devices 500, respectively) may compare an instruction hash taken of a homogenized version of query instructions setting forth a new database query (e.g., the instruction hash 519 taken of the homogenized instructions 510, which is the homogenized version of the query instructions 110) to multiple instruction hashes within a hash index of a results cache (e.g., the hash index 575 of the results cache 570).

If, at 2312, there is a matching instruction hash within the hash index, the processor component may retrieve cached results from the results cache that correspond to the matching instruction hash at 2320. The processor component may then perform a reversal of the homogenization that was performed on query instructions on the cached results to generate the new results that correspond to the new database query set forth by the query instructions. The processor component may then transmit the new results to the device from which the query instructions originated (e.g., the query device 100) and/or to another device to enable viewing and/or further processing of the new results (e.g., the viewing device 700) at 2324.

However, if, at 2312, there is no matching instruction hash within the hash index, the processor component may create a new entry in the results cache in which the new results will be cached and may add the instruction hash to the hash index of the results cache to serve as an index to the new results at 2330. The processor component may then perform at least a portion of the query instructions at 2332 to generate the new results. As has been discussed, execution of the query instructions may be performed by the processor components of one or more node devices, and/or one or more storage devices. The processor component may then store the new results just generated in the new entry made in the results cache at 2334 to enable the new results to be subsequently retrieved as a cached result. The processor component may then transmit the new results to the device from which the query instructions originated and/or to another device to enable viewing and/or further processing of the new results at 2336.

Figure 8:
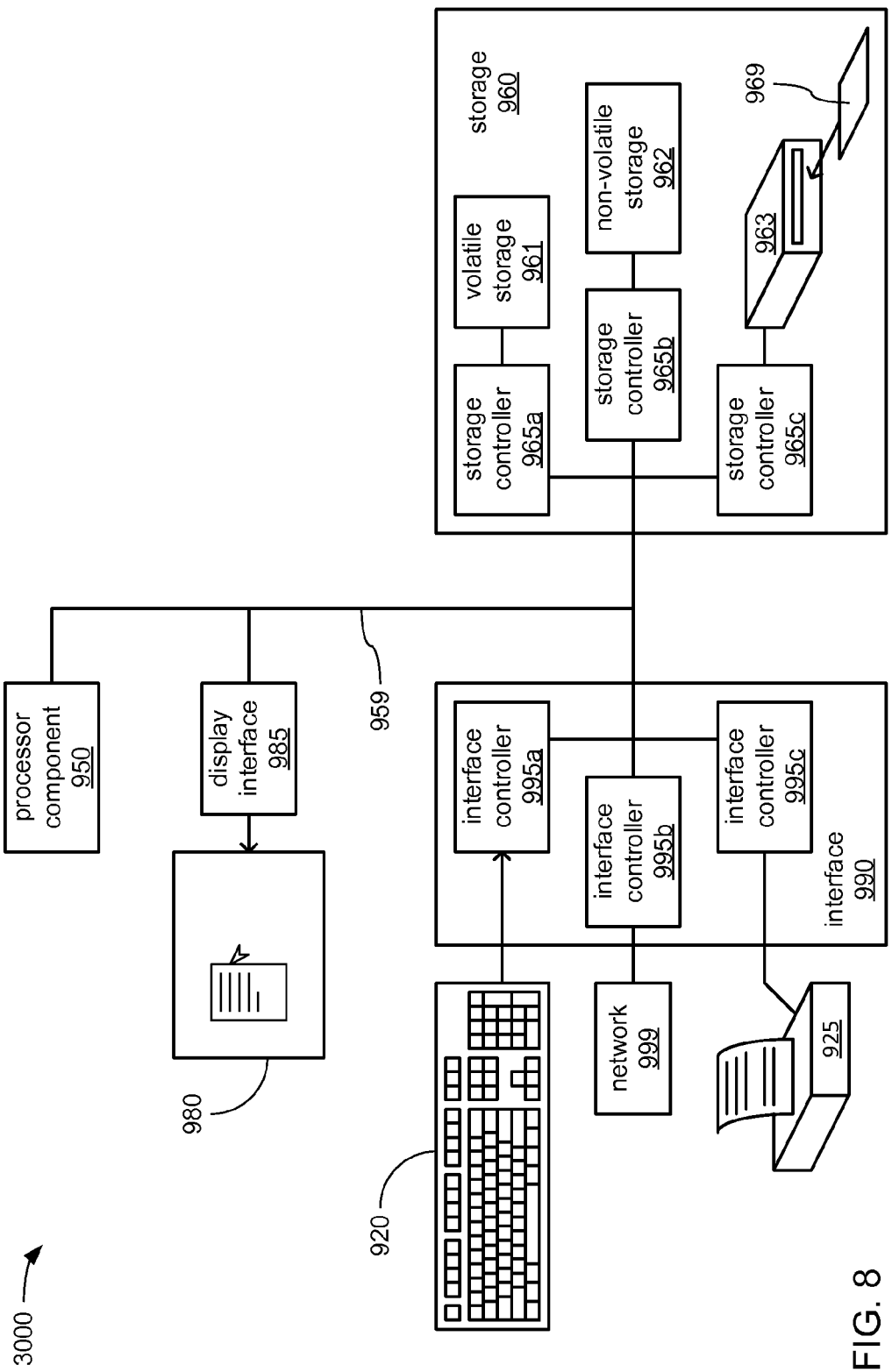
FIG. 8 illustrates an example embodiment of a processing architecture.

FIG. 8 illustrates an example embodiment of a processing architecture 3000 suitable for implementing various embodiments as previously described. More specifically, various aspects and/or portions of the processing architecture 3000 (or variants thereof) may be implemented as part of one or more of the devices 100, 300, 500 or 700. It should be noted that components of the processing architecture 3000 are given reference numbers in which the last two digits correspond to the last two digits of reference numbers of at least some of the components earlier depicted and described as part of the devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component of a software routine can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, and/or a program. Further, one or more components of a software routine may alternately be replaced by hardware-implemented logic, including and not limited to, application-specific integrated circuits (ASICs), programmable logic devices (PLDs) and/or combinational logic implemented with transistors. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150, 350, 550 and 750) may include any of a wide variety of commercially available processors, employing any of a wide variety of technologies and implemented with one or more cores physically combined in any of a number of ways.

As previously discussed, the storage 960 (corresponding to one or more of the storages 160, 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969. The machine-readable storage medium 969, with executable instructions stored thereon, may be an example embodiment of a product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to one or more of the network interfaces 190, 390, 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless timings and/or protocols to access other computing devices through the depicted network 999 (perhaps a network made up of one or more links, smaller networks, or perhaps the Internet). The interface 995*c* may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, which may correspond to the display 180 and/or the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop@, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
   a processor component;
   a network interface coupled to the processor component to receive query instructions executable to retrieve and process data items from a data set for a new database query, wherein the data items are organized within the data set according to an index comprising index labels;
   a renaming component for execution by the processor component to generate homogenized instructions from the query instructions by:
     identifying a declaration instruction within the query instructions that declares an object, names the object and associates the object with an index label of the data set;
     replacing the name provided to the object in the declaration instruction with an archetypal name based on the index label; and
     generating change data that associates the name provided to the object in the declaration instruction with the archetypal name;
   a hashing component for execution by the processor component to take an instruction hash of the homogenized instructions;
   a cache control routine for execution by the processor component to compare the instruction hash to a plurality of instruction hashes of a results cache, wherein each instruction hash of the plurality of instruction hashes corresponds to a cached result of an earlier database query; and
   a reversal routine for execution by the processor component to, in response to a determination that the instruction hash of the homogenized instructions matches an instruction hash of the plurality of instruction hashes:
     retrieve a cached result from an entry of the results cache associated with the matching instruction hash of the plurality of instruction hashes; and
     replace a name of an object within the retrieved cached result based on the change data and the query instructions to generate a new result of the new database query.

2. The apparatus of claim 1, comprising:
   a reordering component for execution by the processor component to reorder a plurality of declaration instructions within the query instructions into an archetypal object order to generate the homogenized instructions, wherein the plurality of declaration instructions comprises the declaration instruction; and
   an execution routine for execution by the processor component to execute the query instructions to generate the new results in response to a determination that the instruction hash of the homogenized instructions does not match any instruction hash of the plurality of instruction hashes, wherein the cache control routine is to:
  generate a new entry in the results cache that is indexed with the instruction hash of the homogenized instructions added to the plurality of instruction hashes; and
  store the new results within the new entry.

3. The apparatus of claim 1, wherein the renaming component is to:
  generate an initial archetypal name from text characters of the index label;
  determine whether the initial archetypal name is already in use to replace a name provided to another object by another declaration instruction;
  in response to a determination that the initial archetypal name is not already in use, employ the initial archetypal name as the archetypal name to replace the name provided to the object by the declaration instruction; and
  in response to a determination that the initial archetypal name is already in use:
    augment the initial archetypal name with a numerical value;
    determine whether the augmented initial archetypal name is already in use;
    increment the numerical value in response to a determination that the augmented initial archetypal name is already in use; and
    employ the augmented initial archetypal name as the archetypal name to replace the name provided to the object by the declaration instruction.

4. The apparatus of claim 1, wherein the renaming component is to:
  determine whether the index label comprises a quantity of text characters that exceeds a predetermined length;
  in response to a determination that the quantity of text characters does not exceed the predetermined length, generate the archetypal name based on the text characters of the index label; and
  in response to a determination that the quantity of text characters does exceed the predetermined length, perform operations including:
    derive a label hash value from the index label; and
    generate the archetypal name based on the label hash value.

5. The apparatus of claim 1, comprising:
  a removal component for execution by the processor component to determine whether execution of a formatting instruction within the query instructions affects a numerical value in the new results, and remove the formatting instruction from the query instructions to generate the homogenized instructions in response to a determination that the formatting instruction does not affect the numerical value; and
  a reforming component for execution by the processor component to replace the formatting instruction with an archetypal formatting instruction to generate the homogenized instructions in response to a determination that the formatting instruction does affect the numerical value.

6. The apparatus of claim 1, comprising:
  a reforming component for execution by the processor component to replace a mathematical operator within the query instructions with an archetypal mathematical operator; and
  a reordering component for execution by the processor component to commutatively reorder a plurality of archetypal mathematical operators and a plurality of operands associated with the plurality of archetypal mathematical operators within the query instructions into an archetypal operation order to generate the homogenized instructions, wherein the plurality of archetypal mathematical operators comprises the archetypal mathematical operator.

7. The apparatus of claim 1, comprising:
  a reforming component for execution by the processor component to replace a Boolean operator within the query instructions with an archetypal Boolean operator; and
  a reduction component for execution by the processor component to reduce a plurality of archetypal Boolean operators and a plurality of operands associated with the plurality of archetypal Boolean operators within the query instructions to a smaller plurality of archetypal Boolean operators and a smaller plurality of operands based on rules of Boolean algebra to generate the homogenized instructions, wherein the plurality of archetypal Boolean operators comprises the archetypal Boolean operator.

8. The apparatus of claim 1, comprising a reduction component for execution by the processor component to:
  determine whether the query instructions define a plurality of detail filters to be employed prior to execution of instructions within the query instructions that perform aggregation;
  in response to a determination that the query instructions define a plurality of detail filters, replace instructions within the query instructions that define the plurality of detail filters with a first "AND" operator that defines the plurality of detail filters to generate the homogenized instructions;
  determine whether the query instructions define a plurality of post-aggregation filters to be employed following the execution of the instructions that perform the aggregation; and
  in response to a determination that the query instructions define a plurality of post-aggregation filters, replace instructions within the query instructions that define the plurality of post-aggregation filters with a second "AND" operator that defines the plurality of post-aggregation filters to generate the homogenized instructions.

9. The apparatus of claim 1, comprising a security component for execution by the processor component to:
  receive permissions data that indicates a degree of access to the data set that a person originating the new database query is granted;
  encode an indication of that degree of access into at least one byte; and
  augment the homogenized instructions with the at least one byte prior to the taking of the instruction hash.

10. The apparatus of claim 1, comprising a security component to:
  receive an indication of a degree of access to the data set that a person originating the new database query is granted;
  encode an indication of that degree of access into at least one byte; and
  augment the homogenized instructions with the at least one byte prior to the taking of the instruction hash.

11. A computer-program product tangibly embodied in a non-transitory machine-readable storage medium, the computer-program product including instructions operable to cause a processor component to perform operations including:

receive query instructions executable to retrieve and process data items from a data set for a new database query, wherein the data items are organized within the data set according to an index comprising index labels;

perform operations to generate homogenized instructions from the query instructions, including:
identify a declaration instruction within the query instructions that declares an object, names the object and associates the object with an index label of the data set;
replace the name provided to the object in the declaration instruction with an archetypal name based on the index label; and
generate change data that associates the name provided to the object in the declaration instruction with the archetypal name;

take an instruction hash of the homogenized instructions;
compare the instruction hash to a plurality of instruction hashes of a results cache, wherein each instruction hash of the plurality of instruction hashes corresponds to a cached result of an earlier database query; and
in response to a determination that the instruction hash of the homogenized instructions matches an instruction hash of the plurality of instruction hashes, perform operations including:
retrieve a cached result from an entry of the results cache associated with the matching instruction hash of the plurality of instruction hashes; and
replace a name of an object within the retrieved cached result based on the change data and the query instructions to generate a new result of the new database query.

12. The computer-program product of claim 11, the processor component is caused to perform operations including:
reorder a plurality of declaration instructions within the query instructions into an archetypal object order to generate the homogenized instructions, wherein the plurality of declaration instructions comprises the declaration instruction; and
in response to a determination that the instruction hash of the homogenized instructions does not match any instruction hash of the plurality of instruction hashes, the processor component is caused to perform operations including:
generate a new entry in the results cache that is indexed with the instruction hash of the homogenized instructions added to the plurality of instruction hashes;
execute the query instructions to generate the new results; and
store the new results within the new entry.

13. The computer-program product of claim 11, the processor component is caused to perform operations including:
generate an initial archetypal name from text characters of the index label;
determine whether the initial archetypal name is already in use to replace a name provided to another object by another declaration instruction;
in response to a determination that the initial archetypal name is not already in use, employ the initial archetypal name as the archetypal name to replace the name provided to the object by the declaration instruction; and
in response to a determination that the initial archetypal name is already in use, perform operations including:
augment the initial archetypal name with a numerical value;
determine whether the augmented initial archetypal name is already in use;
increment the numerical value in response to a determination that the augmented initial archetypal name is already in use; and
employ the augmented initial archetypal name as the archetypal name to replace the name provided to the object by the declaration instruction.

14. The computer-program product of claim 11, the processor component is caused to perform operations to generate the homogenized instructions including:
determine whether the index label comprises a quantity of text characters that exceeds a predetermined length;
in response to a determination that the quantity of text characters does not exceed the predetermined length, generate the archetypal name based on the text characters of the index label; and
in response to a determination that the quantity of text characters does exceed the predetermined length, perform operations including:
derive a label hash value from the index label; and
generate the archetypal name based on the label hash value.

15. The computer-program product of claim 11, the processor component is caused to perform operations to generate the homogenized instructions including:
identify a formatting instruction within the query instructions;
determine whether execution of the formatting instruction affects a numerical value in the new results;
in response to a determination that the formatting instruction does not affect the numerical value, remove the formatting instruction from the query instructions; and
in response to a determination that the formatting instruction does affect the numerical value, replace the formatting instruction with an archetypal formatting instruction.

16. The computer-program product of claim 11, the processor component is caused to perform operations to generate the homogenized instructions including:
replace a mathematical operator within the query instructions with an archetypal mathematical operator; and
commutatively reorder a plurality of archetypal mathematical operators and a plurality of operands associated with the plurality of archetypal mathematical operators within the query instructions into an archetypal operation order, wherein the plurality of archetypal mathematical operators comprises the archetypal mathematical operator.

17. The computer-program product of claim 11, the processor component is caused to perform operations to generate the homogenized instructions including:
replace a Boolean operator within the query instructions with an archetypal Boolean operator; and
reduce a plurality of archetypal Boolean operators and a plurality of operands associated with the plurality of archetypal Boolean operators within the query instructions to a smaller plurality of archetypal Boolean operators and a smaller plurality of operands based on rules of Boolean algebra.

18. The computer-program product of claim 11, the processor component is caused to perform operations to generate the homogenized instructions including:

determine whether the query instructions define a plurality of detail filters to be employed prior to execution of instructions within the query instructions that perform aggregation;

in response to a determination that the query instructions define a plurality of detail filters, replace instructions within the query instructions that define the plurality of detail filters with a first "AND" operator that defines the plurality of detail filters;

determine whether the query instructions define a plurality of post-aggregation filters to be employed following the execution of the instructions that perform the aggregation; and in response to a determination that the query instructions define a plurality of post-aggregation filters, replace instructions within the query instructions that define the plurality of post-aggregation filters with a second "AND" operator that defines the plurality of post-aggregation filters.

19. The computer-program product of claim 11, the processor component is caused to perform operations to generate the homogenized instructions including:

determine whether a pair of axes by which the query instructions process the data items are in an archetypal orientation; and in response to a determination that the pair of axes are not in the archetypal orientation, modify instructions within the query instructions to reverse the pair of axes to place the pair of axes in the archetypal orientation.

20. The computer-program product of claim 11, the processor component is caused to perform operations to generate the homogenized instructions including:

receive permissions data that indicates a degree of access to the data set that a person originating the new database query is granted;

encode an indication of that degree of access into at least one byte; and augment the homogenized instructions with the at least one byte prior to the taking of the instruction hash.

21. A computer-implemented method comprising:

receiving, at a computing device, query instructions executable to retrieve and process data items from a data set for a new database query, wherein the data items are organized within the data set according to an index comprising index labels;

identifying a declaration instruction within the query instructions that declares an object, names the object and associates the object with an index label of the data set;

replacing the name provided to the object in the declaration instruction with an archetypal name based on the index label to generate homogenized instructions from the query instructions;

generating change data that associates the name provided to the object in the declaration instruction with the archetypal name;

take an instruction hash of the homogenized instructions;

comparing the instruction hash to a plurality of instruction hashes of a results cache, wherein each instruction hash of the plurality of instruction hashes corresponds to a cached result of an earlier database query; and in response to a determination that the instruction hash of the homogenized instructions matches an instruction hash of the plurality of instruction hashes, retrieving a cached result from an entry of the results cache associated with the matching instruction hash, and replacing a name of an object within the retrieved cached result based on the change data and the query instructions to generate a new result of the new database query.

22. The computer-implemented method of claim 21, comprising:

reordering a plurality of declaration instructions within the query instructions into an archetypal object order to generate the homogenized instructions, wherein the plurality of declaration instructions comprises the declaration instruction; and in response to a determination that the instruction hash of the homogenized instructions does not match any instruction hash of the plurality of instruction hashes, generating a new entry in the results cache that is indexed with the instruction hash of the homogenized instructions added to the plurality of instruction hashes, executing the query instructions to generate the new results; and storing the new results within the new entry.

23. The computer-implemented method of claim 21, comprising:

determining whether the index label comprises a quantity of text characters that exceeds a predetermined length;

in response to a determination that the quantity of text characters does not exceed the predetermined length, generating the archetypal name based on the text characters of the index label; and in response to a determination that the quantity of text characters does exceed the predetermined length, deriving a label hash value from the index label, and generating the archetypal name based on the label hash value.

24. The computer-implemented method of claim 21, comprising:

generating an initial archetypal name from text characters of the index label;

determining whether the initial archetypal name is already in use to replace a name provided to another object by another declaration instruction;

in response to a determination that the initial archetypal name is not already in use, employing the initial archetypal name as the archetypal name to replace the name provided to the object by the declaration instruction; and in response to a determination that the initial archetypal name is already in use:
augmenting the initial archetypal name with a numerical value;
determining whether the augmented initial archetypal name is already in use;
incrementing the numerical value in response to a determination that the augmented initial archetypal name is already in use; and
employing the augmented initial archetypal name as the archetypal name to replace the name provided to the object by the declaration instruction.

25. The computer-implemented method of claim 21, comprising:

identifying a formatting instruction within the query instructions;

determining whether execution of the formatting instruction affects a numerical value in the new results;

in response to a determination that the formatting instruction does not affect the numerical value, removing the formatting instruction from the query instructions to generate the homogenized instructions; and in response to a determination that the formatting instruction does affect the numerical value, replacing the formatting instruction with an archetypal formatting instruction to generate the homogenized instructions.

26. The computer-implemented method of claim 21, comprising:
    replacing a mathematical operator within the query instructions with an archetypal mathematical operator to generate the homogenized instructions; and
    commutatively reordering a plurality of archetypal mathematical operators and a plurality of operands associated with the plurality of archetypal mathematical operators within the query instructions into an archetypal operation order to generate the homogenized instructions, wherein the plurality of archetypal mathematical operators comprises the archetypal mathematical operator.

27. The computer-implemented method of claim 21, comprising:
    replacing a Boolean operator within the query instructions with an archetypal Boolean operator to generate the homogenized instructions; and
    reducing a plurality of archetypal Boolean operators and a plurality of operands associated with the plurality of archetypal Boolean operators within the query instructions to a smaller plurality of archetypal Boolean operators and a smaller plurality of operands based on rules of Boolean algebra to generate the homogenized instructions, wherein the plurality of archetypal Boolean operators comprises the archetypal Boolean operator.

28. The computer-implemented method of claim 21, comprising:
    determining whether the query instructions define a plurality of detail filters to be employed prior to execution of instructions within the query instructions that perform aggregation;
    in response to a determination that the query instructions define a plurality of detail filters, replacing instructions within the query instructions that define the plurality of detail filters with a first "AND" operation that defines the plurality of detail filters to generate the homogenized instructions;
    determining whether the query instructions define a plurality of post-aggregation filters to be employed following the execution of the instructions that perform the aggregation; and
    in response to a determination that the query instructions define a plurality of post-aggregation filters, replacing instructions within the query instructions that define the plurality of post-aggregation filters with a second "AND" operation that defines the plurality of post-aggregation filters to generate the homogenized instructions.

29. The computer-implemented method of claim 21, comprising:
    determining whether a pair of axes by which the query instructions process the data items are in an archetypal orientation; and
    in response to a determination that the pair of axes are not in the archetypal orientation, modifying instructions within the query instructions to reverse the pair of axes to place the pair of axes in the archetypal orientation as part of generating the homogenized instructions.

30. The computer-implemented method of claim 21, comprising:
    receive permissions data that indicates a degree of access to the data set that a person originating the new database query is granted;
    encode an indication of that degree of access into at least one byte; and
    augment the homogenized instructions with the at least one byte prior to the taking of the instruction hash.

* * * * *